(12) United States Patent
Hendry et al.

(10) Patent No.: US 12,407,861 B2
(45) Date of Patent: Sep. 2, 2025

(54) SIGNALING OF PICTURE HEADER IN VIDEO CODING

(71) Applicant: Huawei Technologies Co., Ltd., Guangdong (CN)

(72) Inventors: Fnu Hendry, San Diego, CA (US); Ye-Kui Wang, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 17/702,418

(22) Filed: Mar. 23, 2022

(65) Prior Publication Data

US 2022/0224945 A1    Jul. 14, 2022

Related U.S. Application Data

(63) Continuation of application No. PCT/US2020/045038, filed on Aug. 5, 2020.

(60) Provisional application No. 62/905,150, filed on Sep. 24, 2019.

(51) Int. Cl.
| | |
|---|---|
| *H04N 19/70* | (2014.01) |
| *H04N 19/169* | (2014.01) |
| *H04N 19/172* | (2014.01) |
| *H04N 19/174* | (2014.01) |
| *H04N 19/44* | (2014.01) |
| *H04N 19/46* | (2014.01) |

(52) U.S. Cl.
CPC .......... *H04N 19/70* (2014.11); *H04N 19/172* (2014.11); *H04N 19/174* (2014.11); *H04N 19/188* (2014.11); *H04N 19/44* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 6,965,646 B1 | 11/2005 | Firestone | |
| 10,674,171 B2 | 6/2020 | Samuelsson et al. | |
| 12,010,309 B2 | 6/2024 | Poirier et al. | |
| 2003/0068089 A1 | 4/2003 | Sano et al. | |
| 2006/0050793 A1 | 3/2006 | Wang et al. | |

(Continued)

FOREIGN PATENT DOCUMENTS

| | | |
|---|---|---|
| CN | 1764276 A | 4/2006 |
| EP | 3399752 A1 | 11/2018 |

(Continued)

OTHER PUBLICATIONS

Document: JVET-O0146-v1, Wang, Y., "AHG17: On unspecified NAL unit types," Joint Video Experts Team (JVET) of ITU-T SG 16 WP 3 and ISO/IEC JTC 1/SC 29/WG11, 15th Meeting: Gothenburg, SE, Jul. 3-12, 2019, 5 pages, XP030205447.

(Continued)

*Primary Examiner* — James M Anderson, II
(74) *Attorney, Agent, or Firm* — Conley Rose, P.C.

(57) ABSTRACT

A method of decoding is provided. The method includes receiving a video bitstream including a picture unit (PU), where the PU includes a picture header (PH) network abstraction layer (NAL) unit preceding a first video coding layer (VCL) NAL unit, and decoding a coded picture from the PU to obtain a decoded picture.

19 Claims, 12 Drawing Sheets

(56) References Cited

U.S. PATENT DOCUMENTS

| | | |
|---|---|---|
| 2006/0083300 A1 | 4/2006 | Han et al. |
| 2006/0171471 A1* | 8/2006 | Zhou ................. H04N 21/8455 |
| | | 375/E7.267 |
| 2007/0171986 A1 | 7/2007 | Hannuksela |
| 2013/0064284 A1 | 3/2013 | Samuelsson et al. |
| 2013/0077681 A1 | 3/2013 | Chen et al. |
| 2013/0101037 A1 | 4/2013 | Chono et al. |
| 2013/0107953 A1 | 5/2013 | Chen et al. |
| 2013/0114735 A1 | 5/2013 | Wang |
| 2013/0182755 A1 | 7/2013 | Chen et al. |
| 2013/0195201 A1 | 8/2013 | Boyce et al. |
| 2013/0322531 A1 | 12/2013 | Chen et al. |
| 2013/0343465 A1* | 12/2013 | Chen ....................... H04N 19/70 |
| | | 375/240.24 |
| 2014/0003520 A1 | 1/2014 | Rodriguez et al. |
| 2014/0092955 A1 | 4/2014 | Wang |
| 2014/0092963 A1 | 4/2014 | Wang |
| 2014/0098894 A1 | 4/2014 | Wang |
| 2014/0153636 A1 | 6/2014 | Esenlik et al. |
| 2014/0192897 A1 | 7/2014 | Wang et al. |
| 2014/0314148 A1 | 10/2014 | Lainema et al. |
| 2015/0063453 A1 | 3/2015 | Kang et al. |
| 2015/0110192 A1 | 4/2015 | Wang et al. |
| 2015/0146976 A1 | 5/2015 | Ma et al. |
| 2015/0195577 A1 | 7/2015 | Hannuksela |
| 2015/0326883 A1 | 11/2015 | Rosewarne |
| 2015/0382018 A1 | 12/2015 | Hendry et al. |
| 2015/0382023 A1 | 12/2015 | Ramasubramonian et al. |
| 2016/0212439 A1 | 7/2016 | Hannuksela |
| 2016/0381393 A1 | 12/2016 | Tsukuba et al. |
| 2017/0105004 A1 | 4/2017 | Chen et al. |
| 2017/0237999 A1 | 8/2017 | Hendry et al. |
| 2017/0324981 A1 | 11/2017 | Deshpande |
| 2018/0248653 A1 | 8/2018 | Ishigaya et al. |
| 2020/0404334 A1 | 12/2020 | Coban et al. |
| 2021/0092426 A1 | 3/2021 | Choi et al. |
| 2021/0144384 A1 | 5/2021 | Berg et al. |
| 2022/0060752 A1 | 2/2022 | Pettersson et al. |
| 2022/0067052 A1 | 3/2022 | Chauhan et al. |
| 2022/0321922 A1 | 10/2022 | Kim et al. |

FOREIGN PATENT DOCUMENTS

| | | |
|---|---|---|
| EP | 3005705 B1 | 2/2019 |
| JP | 2003169333 A | 6/2003 |
| JP | 2013048307 A | 3/2013 |
| JP | 6224162 B2 | 11/2017 |
| JP | 6272343 B2 | 1/2018 |
| RU | 2584491 C2 | 5/2016 |
| RU | 2618942 C2 | 5/2017 |
| RU | 2619194 C2 | 5/2017 |
| RU | 2625534 C2 | 7/2017 |
| RU | 2630176 C2 | 9/2017 |
| RU | 2633100 C2 | 10/2017 |
| RU | 2635892 C2 | 11/2017 |
| RU | 2639958 C2 | 12/2017 |
| RU | 2646325 C2 | 3/2018 |
| RU | 2653299 C2 | 5/2018 |
| RU | 2667048 C2 | 9/2018 |
| WO | 2013012372 A1 | 1/2013 |
| WO | 2014165653 A2 | 10/2014 |
| WO | 2015137237 A1 | 9/2015 |
| WO | 2015137432 A1 | 9/2015 |
| WO | 2015140401 A1 | 9/2015 |
| WO | 2018159987 A1 | 9/2018 |
| WO | 2021055699 A1 | 3/2021 |
| WO | 2021100724 A1 | 5/2021 |
| WO | 2021133519 A1 | 7/2021 |

OTHER PUBLICATIONS

Document: JVET-O2001-vE, Bross, B., et al., "Versatile Video Coding (Draft 6)," Joint Video Experts Team (JVET) of ITU-T SG 16 WP 3 and 1S0/IEC JTC 1/SC 29/WG 11, 15th Meeting: Gothenburg, SE, Jul. 3-12, 2019, 455 pages, XP030218400.

Sjoberg, R., et al., "Overview of HEVC High-Level Syntax and Reference Picture Management," IEEE Transactions on Circuits and Systems for Video Technology, vol. 22, No. 12, Dec. 2012, 13 pages, XP011487159.

Document: JVET-L0415-v1, Sjoberg, R., et al., "Tile groups for VVC," Joint Video Experts Team (JVET) of ITU-T SG 16 WP 3 and ISO/IEC JTC 1/SC29/WG 11, 12th Meeting: Macao, CN, Oct. 3-12, 2018, 4 pages, XP030193912.

Document: JVET-S0269 SpecText based on JVET-S2001-v5, [online], Bross, B., et al., "Versatile Video Coding (Draft 10)," Joint Video Experts Team (JVET) of ITU-T SG 16 WP 3 and ISO/IEC JTC 1/SC 29/WG 11, 19th Meeting: by teleconference, Jun. 29, 2020, pp. 3-13, 37, 49-52, 88-95, 106, 124-132.

Document: JVET-M0377-v2, Sjoberg, R., et al., "AHG17: Picture header NAL unit type," Joint Video Experts Team (JVET) of ITU-T SG 16 WP 3 and ISO/IECJTC 1/SC 29/WG11, 14th Meeting: Marrakesh, MA, Jan. 9-18, 2019, 8 pages, XP030213854.

Document: JVET-P1006-v2, Wan, W., et al., "AHG17: Text for picture header," Joint Video Experts Team (JVET) of ITU-T SG 16 WP 3 and ISO/IECJTC 1/SC 29/WG11, 16th Meeting: Geneva, CH, Oct. 1-11, 2019, 4 pages, XP030218401.

Document: JVET-M0260, Hannuksela, M., "AHG 17: Carriage of tile group header parameters in higher level structures," Joint Video Experts Team (JVET) of ITU-T SG 16 WP 3 and ISO/IEC JTC 1/SC 29/WG11, 13th Meeting: Marrakech, MA, Jan. 9-18, 2019, 9 pages, XP030200250.

Document: JVET-P0120-v1, Hendry, et al., "AHG17: On Access Unit Delimiter and Picture Header," Joint Video Experts Team (JVET) of ITU-T SG 16 WP 3 and ISO/IECJTC 1/SC 29/WG11, 16th Meeting: Geneva, CH, Oct. 1-11, 2019, 3 pages, XP030216308.

Document: JVET-M0415, Deshpande, S., "Comments on High-Level Syntax of VVC," Joint Video Experts Team (JVET) of ITU-T SG 16 WP 3 and ISO/IEC JTC 1/SC 29/WG11, 13th Meeting: Marrakech, MA, Jan. 9-18, 2019, 7 pages, XP030200487.

Document: JVET-M0430, Skupin, R., et al., "AHG12: On Tiles and Tile Groups for VVC," Joint Video Experts Team (JVET) of ITU-T SG 16 WP 3 and ISO/IEC JTC 1/SC 29/WG11, 13th Meeting: Marrakech, MA, Jan. 9-18, 2019, 3 pages, XP030197975.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, 491 pages, XP030224330.

Document: JVET-Q2001-vE, Bross, B., et al., "Versatile Video Coding (Draft 8)," Joint Video Experts Team (JVET) of ITU-T SG 16 WP 3 and ISO/IEC JTC 1/ SC 29/WG11, 17th Meeting: Brussels, BE, Jan. 7-17, 2020, 512 pages, XP030285390.

Document: JVET-O2001-vE, Bross, B., et al., "Versatile Video Coding (Draft 6)," Joint Video Experts Team (JVET) of ITU-T SG 16 WP 3 and ISO/IEC JTC 1/ SC 29/WG11, 15th Meeting: Gothenburg, SE, Jul. 3-12, 2019, 455 pages, XP030293944.

Wenger Stephan et al., "RTP payload format for H.264/SVC scalable video coding," Journal of Zhejiang University Science A, May 2006, 12 pages.

"Line Transmission of Non-Telephone Signals Video Codec for Audiovisual Services at px64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

(56) References Cited

OTHER PUBLICATIONS

"Series H: Audiovisual and Multimedia Systems; Infrastructure of audiovisual services—Coding of moving video; High efficiency video coding" Recommendation ITU-T H.265, Apr. 2013, 317 pages.
Bross, B., et al., "Versatile Video Coding (Draft 6)," Document: JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
Wenger, S., et al., "RTP Payload format for H.264/SVC scalable video coding," Journal of Zhejiang University, Science A ISSN 100-3095 (Print); ISSN 1862-1775 (Online), Feb. 25, 2006, 3 pages.
Hannuksela, M., et al., "Isolated Regions in Video Coding," IEEE Transactions on Multimedia, vol. 6, No. 2, Apr. 2004, 9 pages.
Chan, Y., "Introduction to H.264: (1) NAL Unit," H.264, ISO, ITU-T, MPEG-4, Standard/Specification, Nov. 12, 2014, 8 pages.
Series HL Audiovisual and Multimedia Systems Infrastructure of audiovisual services—Coding of moving video;High efficiency video coding; Recommendation ITU-T H.265, Feb. 2018, 21 pages total. pp. 11 and 66-70.
Supervised by Sakae Okubo, Impress standardization textbook series H.265/HEVC textbook, the first edition, Impress Japan co., Ltd., Oct. 21, 2013, pp. 93-95, 192-197, ISBN: 978-4-8443-3468-2.
Edited by Tokumichi Murakami (and two others), High efficiency video coding technique HEVC/H.265 and their applications, the first edition, Feb. 25, 2013, pp. 79-82, ISBN: 978-4-274-21329-8.
Document: JVET-R0065-v1, Wang, Y.K., et al., "AHG8/AHG9: On IRAP and GDR AUs," Joint Video Experts Team (JVET) of ITU-T SG 16 WP 3 and ISO/IEC JTC 1/SC 29/WVG 11, 18th Meeting: by teleconference, Apr. 15-24, 2020, 3 pages.

Author: Yumi Chan, "Introduction to H.264: (1) NAL Unit," Nov. 12, 2014, URL:https://yumichan.net/video-processing/video-compression/introduction-to-h264-nal-unit/, 8 pages.
Document: JVET-S2001-v5, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 538 pages.
Hannuksela (Nokia) M M: "AHG12/AHG17: On merging of MCTSs for viewport-dependent streaming", 13. JVET Meeting; Jan. 9-18, 2019; Marrakech; (The Joint Video Exploration Team of ISO/IEC JTC1/SC29/WG11 and ITU-T SG. 16) no. JVET-M0388 Jan. 2, 2019, XP030200308, total 5 pages.
Chen L et al: "AHG17: Signaling random access properties in the NAL unit header", 13 JVET Meeting; Jan. 9-18, 2019; Marrakech; (The Joint Video Exploration Team of ISO/IEC JTC1/SC29/WG11 and ITU-T SG. 16) no. JVET-M0161 Jan. 2, 2019, XP030200206, total 5 pages.
Sjoberg (Ericsson) ret al: "AHG9: Picture header enabled flag", 17. JVET Meeting; Jan. 7-17, 2020; Brussels; (The Joint Video Exploration Team of ISO/IEC JTC1/SC29/WG11 and ITU-T SG. 16) no. JVET-Q0426; m52021 Dec. 31, 2019, XP030223473, total 15 pages.
Miska M. Hannuksela et al, "AHG12: On independently coded picture regions," Joint Video Experts Team (JVET) of ITU-T SG 16 WP 3 and ISO/IEC JTC 1/SC 29/WG 11, Document: JVET-O0394, 15th Meeting: Gothenburg, SE, Jul. 3-12, 2019, total 8 pages.
Joint Video Experts Team (JVET) of ITU-T SG 16 WP 3 and ISO/IEC JTC 1/SC 29/WG 11, JVET-N1001-v10, "Versatile Video Coding (Draft 5)," Benjamin Bross et al., Editors Mar. 19-27, 2019, total 408 pages.

\* cited by examiner

SIGNALING OF PICTURE HEADER IN VIDEO CODING

CROSS-REFERENCE TO RELATED APPLICATIONS

This patent application is a continuation of International Application No. PCT/US2020/045038 filed on Aug. 5, 2020, by Futurewei Technologies, Inc., and titled "Signaling of Picture Header in Video Coding," which claims the benefit of U.S. Provisional Patent Application No. 62/905,150 filed Sep. 24, 2019, by Futurewei Technologies, Inc., and titled "Signalling of Picture Header in Video Coding," each of which is hereby incorporated by reference.

TECHNICAL FIELD

In general, this disclosure describes techniques for determining the starting point of a picture in a bitstream in video coding. More specifically, this disclosure ensures that the starting point of the picture may be accurately determined within a multi-layer bitstream in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder, comprising: receiving, by the video decoder, a video bitstream including a picture unit (PU), the PU including a picture header (PH) network abstraction layer (NAL) unit preceding a first video coding layer (VCL) NAL unit; and decoding, by the video decoder, a coded picture from the PU to obtain a decoded picture.

The method provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PU includes only one picture header (PH), and wherein the coded picture is the only picture in the PU.

Optionally, in any of the preceding aspects, another implementation of the aspect provides that the PH NAL unit in the PU precedes each VCL NAL unit in the PU inclusive of a first VCL NAL unit of the PU.

Optionally, in any of the preceding aspects, another implementation of the aspect provides that the first VCL NAL unit includes a slice of the coded picture.

Optionally, in any of the preceding aspects, another implementation of the aspect provides that the PH NAL unit is a non-VCL NAL unit.

Optionally, in any of the preceding aspects, another implementation of the aspect provides that the PH NAL unit includes the only one PH.

Optionally, in any of the preceding aspects, another implementation of the aspect provides that the only one PH in the PH NAL unit includes syntax elements that apply to all slices of the coded picture.

Optionally, in any of the preceding aspects, another implementation of the aspect provides that the first VCL NAL unit is an initial VCL NAL unit in the PU.

Optionally, in any of the preceding aspects, another implementation of the aspect provides that displaying the decoded picture on a display of an electronic device.

A second aspect relates to a method of encoding implemented by a video encoder, the method comprising: generating, by the video encoder, a picture unit (PU) including a picture header (PH) network abstraction layer (NAL) unit preceding a first video coding layer (VCL) NAL unit; encoding, by the video encoder, the PU into a video bitstream; and storing, by the video encoder, the video bitstream for communication toward a video decoder.

The method provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PU includes only one picture header (PH) and a coded picture, and wherein the coded picture is the only picture in the PU.

Optionally, in any of the preceding aspects, another implementation of the aspect provides that the PH NAL unit in the PU precedes each VCL NAL unit in the PU inclusive of the first VCL NAL unit.

Optionally, in any of the preceding aspects, another implementation of the aspect provides that the first VCL NAL unit includes a slice of the coded picture.

A third aspect relates to a decoding device. The decoding device includes a receiver configured to receive a video bitstream including a picture unit (PU), the PU including a picture header (PH) network abstraction layer (NAL) unit preceding a first video coding layer (VCL) NAL unit; a memory coupled to the receiver, the memory storing instructions; and a processor coupled to the memory, the processor configured to execute the instructions to cause the decoding device to: decode a coded picture from the PU to obtain a decoded picture.

The decoding device provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PU includes only one picture header (PH), and wherein the coded picture is the only picture in the PU.

Optionally, in any of the preceding aspects, another implementation of the aspect provides that the PH NAL unit in the PU precedes each VCL NAL unit in the PU inclusive of the first VCL NAL unit.

Optionally, in any of the preceding aspects, another implementation of the aspect provides that the first VCL NAL unit includes a slice of the coded picture.

A fourth aspect relates to an encoding device. The encoding device includes a memory containing instructions; a processor coupled to the memory, the processor configured to implement the instructions to cause the encoding device to: generate a picture unit (PU) including a picture header (PH) network abstraction layer (NAL) unit preceding a first video coding layer (VCL) NAL unit; encode the PU into a video bitstream; and a transmitter coupled to the processor, the transmitter configured to transmit the video bitstream toward a video decoder.

The encoding device provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PU includes only one picture header (PH) and a coded picture, and wherein the coded picture is the only picture in the PU.

Optionally, in any of the preceding aspects, another implementation of the aspect provides that the PH NAL unit in the PU precedes each VCL NAL unit in the PU inclusive of the first VCL NAL unit, and wherein the first VCL NAL unit includes a slice of the coded picture.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

Optionally, in any of the preceding aspects, another implementation of the aspect provides a display configured to display a decoded picture.

The coding apparatus provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

The system provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
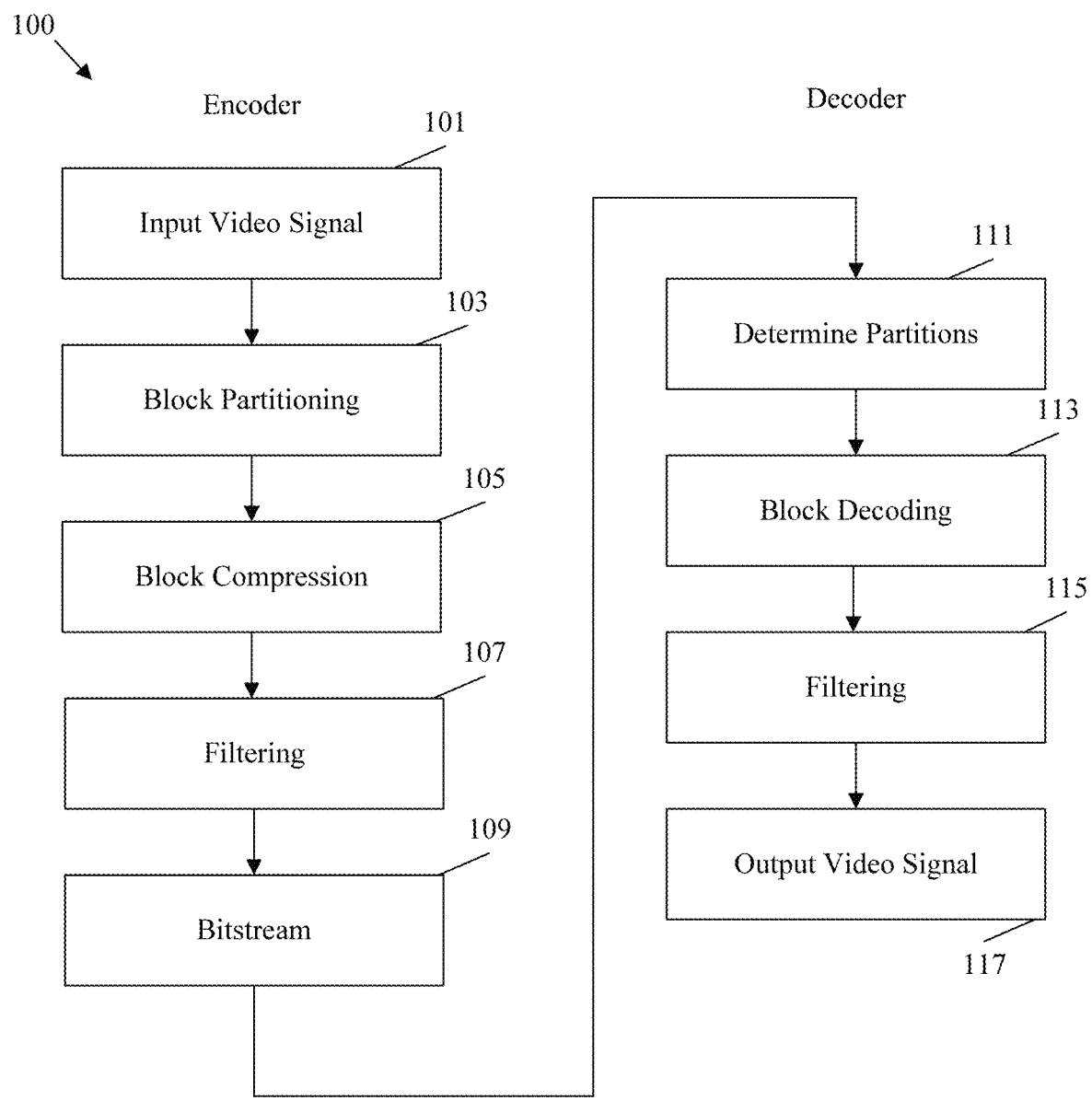
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A picture parameter set (PPS) is a parameter set that contains data related to an entire picture. More specifically, the PPS is a syntax structure containing syntax elements that apply to zero or more entire coded pictures as determined by a syntax element found in each picture header. A sequence parameter set (SPS) is a parameter set that contains data related to a sequence of pictures. An access unit (AU) is a set of one or more coded pictures associated with the same display time (e.g., the same picture order count) for output from a decoded picture buffer (DPB) (e.g., for display to a user). An access unit delimiter (AUD) is an indicator or data structure used to indicate the start of an AU or the boundary between AUs. A decoded video sequence is a sequence of pictures that have been reconstructed by a decoder in preparation for display to a user.

The following acronyms are used herein, Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Picture Parameter Set (PPS), Raw Byte Sequence Payload (RBSP), Sequence Parameter Set (SPS), Versatile Video Coding (VVC), and Working Draft (WD).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogeneous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
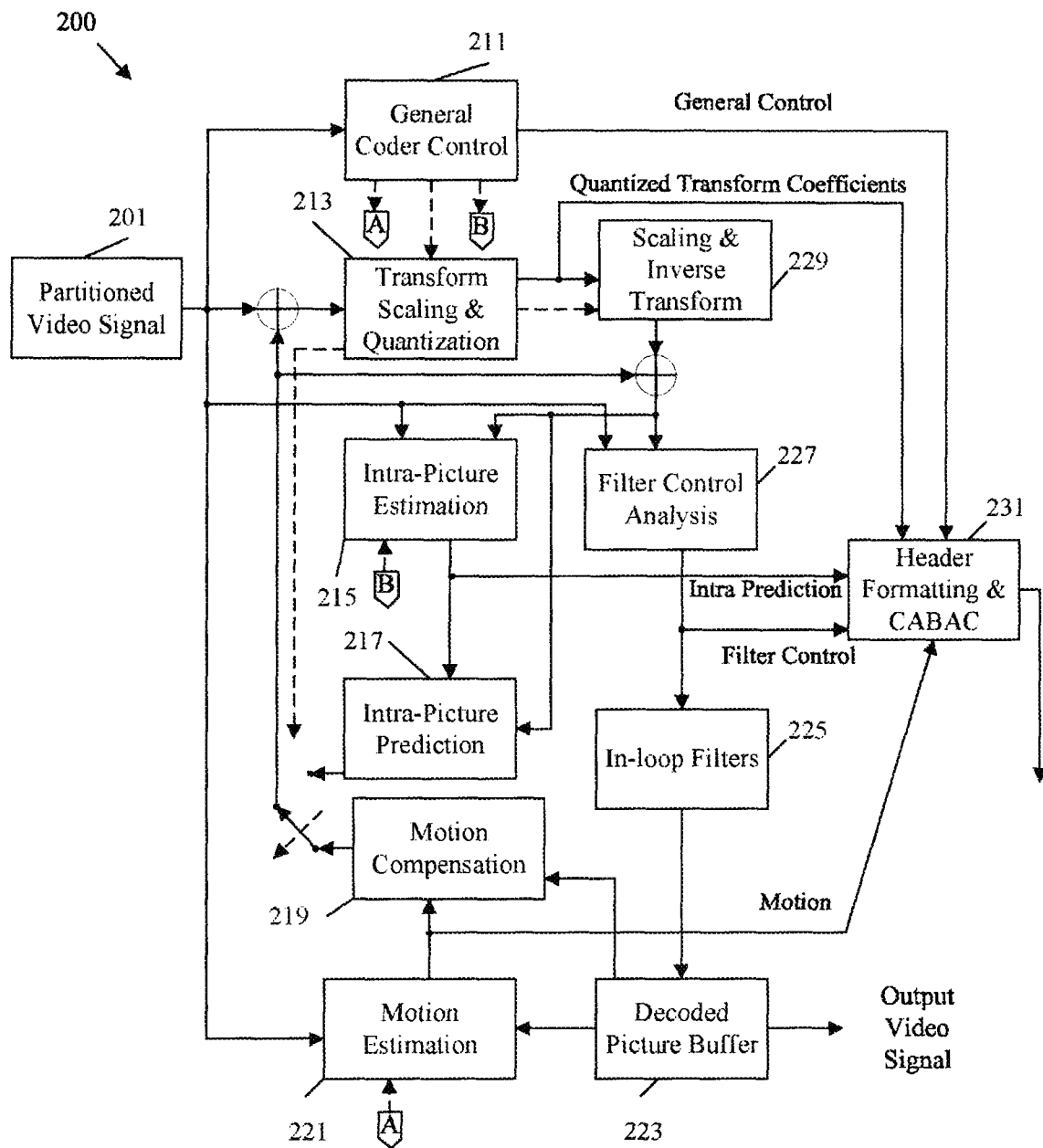
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit containing prediction data and/or a transform unit (TU) containing transformed residual data for the CU. The motion estimation component 221 generates motion vectors, prediction units, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a prediction unit of a video block in an inter-coded slice by comparing the position of the prediction unit to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the prediction unit of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
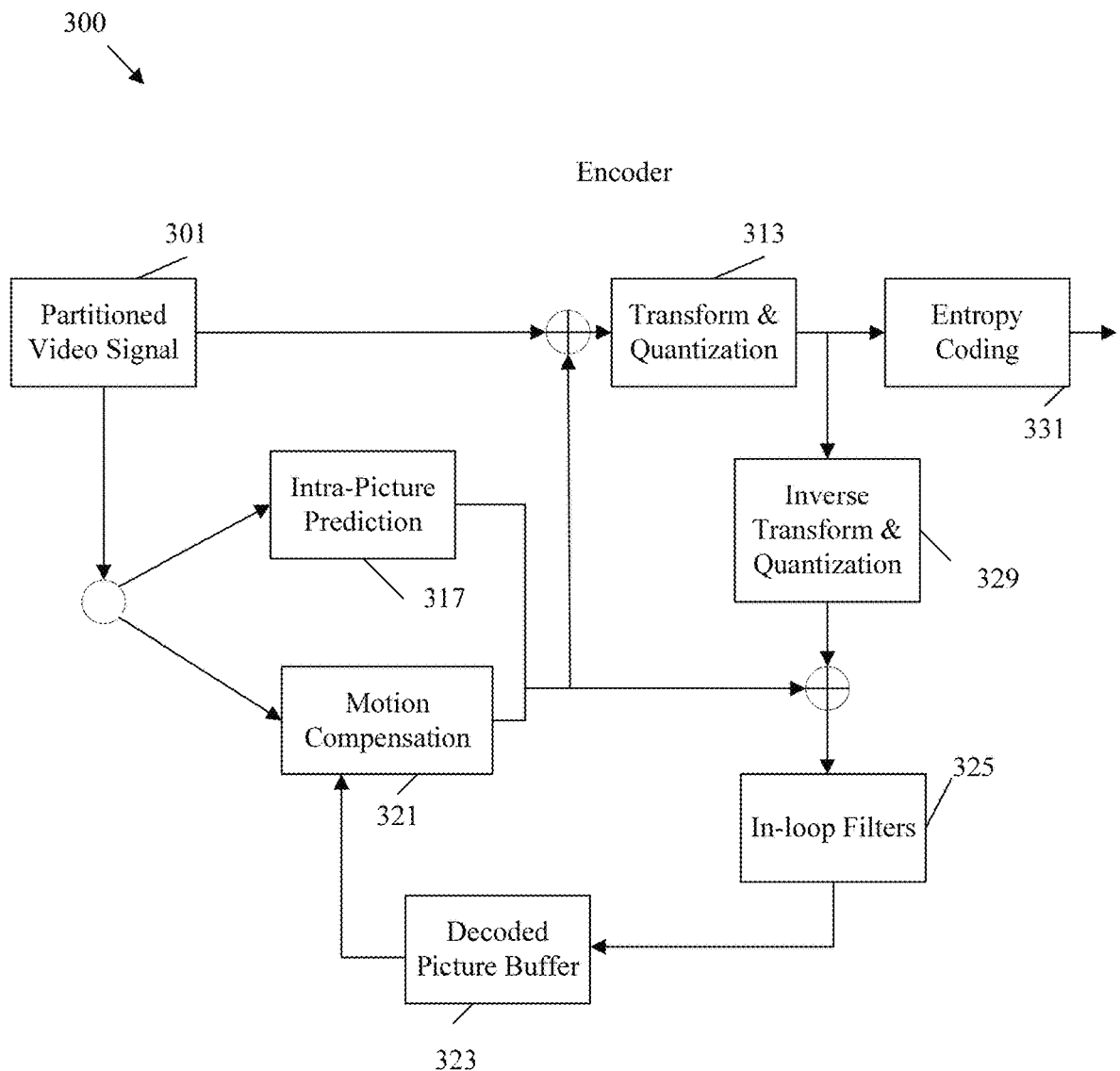
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
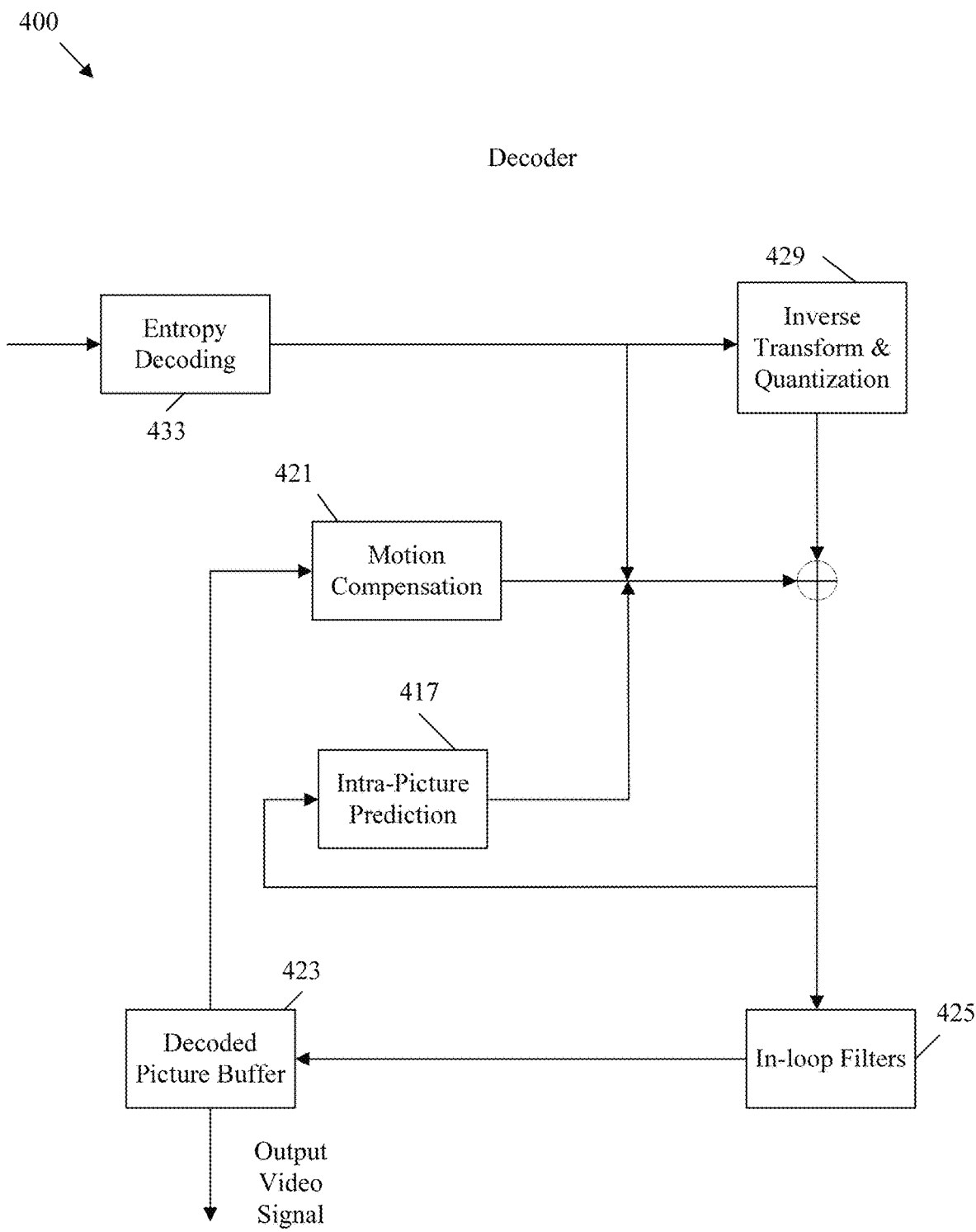
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (WET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

The picture partitioning schemes in HEVC are discussed.

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own Network Adaptation Layer (NAL) unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, the tiles do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases where a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

The picture partitioning schemes in VVC are discussed.

HEVC includes four different picture partitioning schemes, namely slices, tiles and bricks, and Wavefront Parallel Processing (WPP), which may be applied for Maximum Transfer Unit (MTU) size matching, parallel processing, and reduced end-to-end delay.

Tiles in VVC are like tiles in HEVC. Tiles define horizontal and vertical boundaries that partition a picture into tile columns and rows. In VVC, the concept of tiles is further improved by allowing a tile to be further split horizontally to form bricks. A tile that is not further split is also considered a brick. The scan order of CTBs is changed to be local within a brick (in the order of a CTB raster scan of a brick), before decoding the top-left CTB of the next brick in the order of brick raster scan of a picture.

Slices in VVC comprise one or more bricks. Each slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still be interdependencies due to loop filtering operations). VVC defines two kinds of slices, which are: rectangular slice and raster-scan slice. A rectangular slice comprises one or more bricks that occupy a rectangular region within a picture. A raster-scan slice comprises one or more bricks that are in raster-scan order of bricks within a picture.

The WPP feature in VVC is similar to the WPP feature in HEVC with the difference that HEVC WPP has a two (2)

CTU delay whereas VVC WPP has one (1) CTU delay. For HEVC WPP, a new decoding thread can start decoding the first CTU in its assigned CTU row after the previous CTU row has its first two CTUs already decoded; on the other hand, for VVC WPP, a new decoding thread can start decoding the first CTU in its assigned CTU row after the previous CTU row has its first CTU already decoded.

The signaling of tiles, bricks, and slices in PPS is discussed.

The current signaling of tiles, bricks, and slices (particularly rectangular slices) in PPS is as follows:

| | Descriptor |
|---|---|
| pic_parameter_set_rbsp( ) { | |
| ... | |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     if( uniform_tile_spacing_flag && brick_splitting_present_flag ) | |
|       num_tiles_in_pic_minus1 | ue(v) |
|     for( i = 0; brick_splitting_present_flag && i <= num_tiles_in_pic_minus1 + 1; i++ ) { | |
|       if( RowHeight[ i ] > 1 ) | |
|         brick_split_flag[ i ] | u(1) |
|       if( brick_split_flag[ i ] ) { | |
|         if( RowHeight[ i ] > 2 ) | |
|           uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus2[ i ] | ue(v) |
|           for( j = 0; j <= num_brick_rows_minus2[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       bottom_right_brick_idx_length_minus1 | ue(v) |
|       for( i = 0; i < num_slices_in_pic_minus1; i++ ) { | |
|         bottom_right_brick_idx_delta[ i ] | u(v) |
|         brick_idx_delta_sign_flag[ i ] | u(1) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
| ... | |
| } | |

Slices are associated with slice header which contains syntax element to describe the property of the slices which are needed for decoding the slices. The example of slice header syntax table and introduction part of the slice header semantics are given below.

General slice header syntax.

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   non_reference_picture_flag | u(1) |
|   slice_type | ue(v) |
|   if( separate_colour_plane_flag = = 1 ) | |
|     colour_plane_id | u(2) |
|   slice_pic_order_cnt_lsb | u(v) |
|   if( nal_unit_type = = GDR_NUT ) | |
|     recovery_poc_cnt | ue(v) |
|   if( nal_unit_type = = IDR_W_RADL \|\| nal_unit_type = = IDR_N_LP \|\| nal_unit_type = = CRA_NUT \|\| NalUnitType = = GDR_NUT ) | |
|     no_output_of_prior_pics_flag | u(1) |
|   if( output_flag_present_flag ) | |
|     pic_out_put_flag | u(1) |
|   ... | |
| } | |

General slice header semantics.

When present, the value of each of the slice header syntax elements slice_pic_parameter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture.

The variable CuQpDeltaVal, specifying the difference between a luma quantization parameter for the coding unit containing cu_qp_delta_abs and its prediction, is set equal to 0. The variables CuQpOffsetCb, CuQpOffsetCr, and CuQpOffsetCbCr, specifying values to be used when determining the respective values of the Qp'Cb, Qp'Cr, and Qp'CbCr quantization parameters for the coding unit containing cu_chroma_qp_offset_flag, are all set equal to 0.

The access unit delimiter is discussed.

At the 15th JVET meeting in Gothenburg, it was agreed to mandate the presence of access unit delimiter (AUD) for each picture in VVC bitstreams. AUD is mandated to be present before the first slice of each picture which helps decoder implementation to detect the beginning of a new picture in VVC bitstream.

The syntax and semantics of AUD RBSP is as follows.

| | Descriptor |
|---|---|
| access_unit_delimiter_rbsp( ) { | |
|   pic_type | u(3) |
|   rbsp_trailing_bits( ) | |
| } | |

The access unit delimiter is used to indicate the start of an access unit and the type of slices present in the coded pictures in the access unit containing the access unit delimiter NAL unit. There is no normative decoding process associated with the access unit delimiter.

pic_type indicates that the slice type values for all slices of the coded pictures in the access unit containing the access unit delimiter NAL unit are members of the set listed in Table 7-3 for the given value of pic_type. The value of pic_type shall be equal to 0, 1, or 2 in bitstreams conforming to this version of this Specification. Other values of pic_type are reserved for future use by ITU T|ISO/IEC. Decoders conforming to this version of this Specification shall ignore reserved values of pic_type.

TABLE 7-3

Interpretation of pic_type

| pic_type | slice_type values that may be present in the coded picture |
|---|---|
| 0 | I |
| 1 | P, I |
| 2 | B, P, I |

Problems with the access unit delimiter are discussed.

By mandating AUD to be present for each picture, several problems are identified as follows.

Only one access unit delimiter is present for each picture or access unit and is supposed to be contained in the NAL unit that is the first in an access unit. However, if an access unit contains more than one picture, such as in multi-layer bitstream cases, the access unit delimiter can only assist detection of each access unit, not each picture.

In a single layer bitstream, since one AUD is present for each picture, some syntax elements that are currently signaled in the slice header but constrained to be the same for all slices of the same picture should be moved to AUD. Such syntax elements may be referred to as picture-level syntax elements. However, given that the NAL unit containing the AUD is supposed to be the first NAL unit in an access unit, the NAL unit containing the AUD may precede the NAL units containing parameter sets such as the SPS, PPS, etc. The order of the AUD and the parameter sets limits the flexibility for moving picture-level syntax elements from the slice header to the AUD, and the parsing of those syntax elements may have dependency to information signaled in parameter sets.

The description of the techniques disclosed herein are based on the under-development video coding standard Versatile Video Coding (VVC) by the joint video experts team (JVET) of ITU-T and ISO/IEC. However, the techniques also apply to other video codec specifications.

As noted above, an AUD has been used to indicate the start of each AU, and hence the starting point of a picture, when the bitstream contains a single layer. However, the AUD is unable to provide the same functionality for a multi-layer bitstream because the multi-layer bitstream includes multiple pictures at different resolutions within the same AU. Accordingly, when the access unit contains more than one picture, such as in the multi-layer bitstream, the AUD is only able to indicate the start point of the AU, but not the start point of a particular picture in the AU.

Disclosed herein are techniques that ensure a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

Scalability in video coding usually is supported by using multi-layer coding techniques. A multi-layer bitstream comprises a base layer (BL) and one or more enhancement layers (ELs). An example of scalabilities includes spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 5:
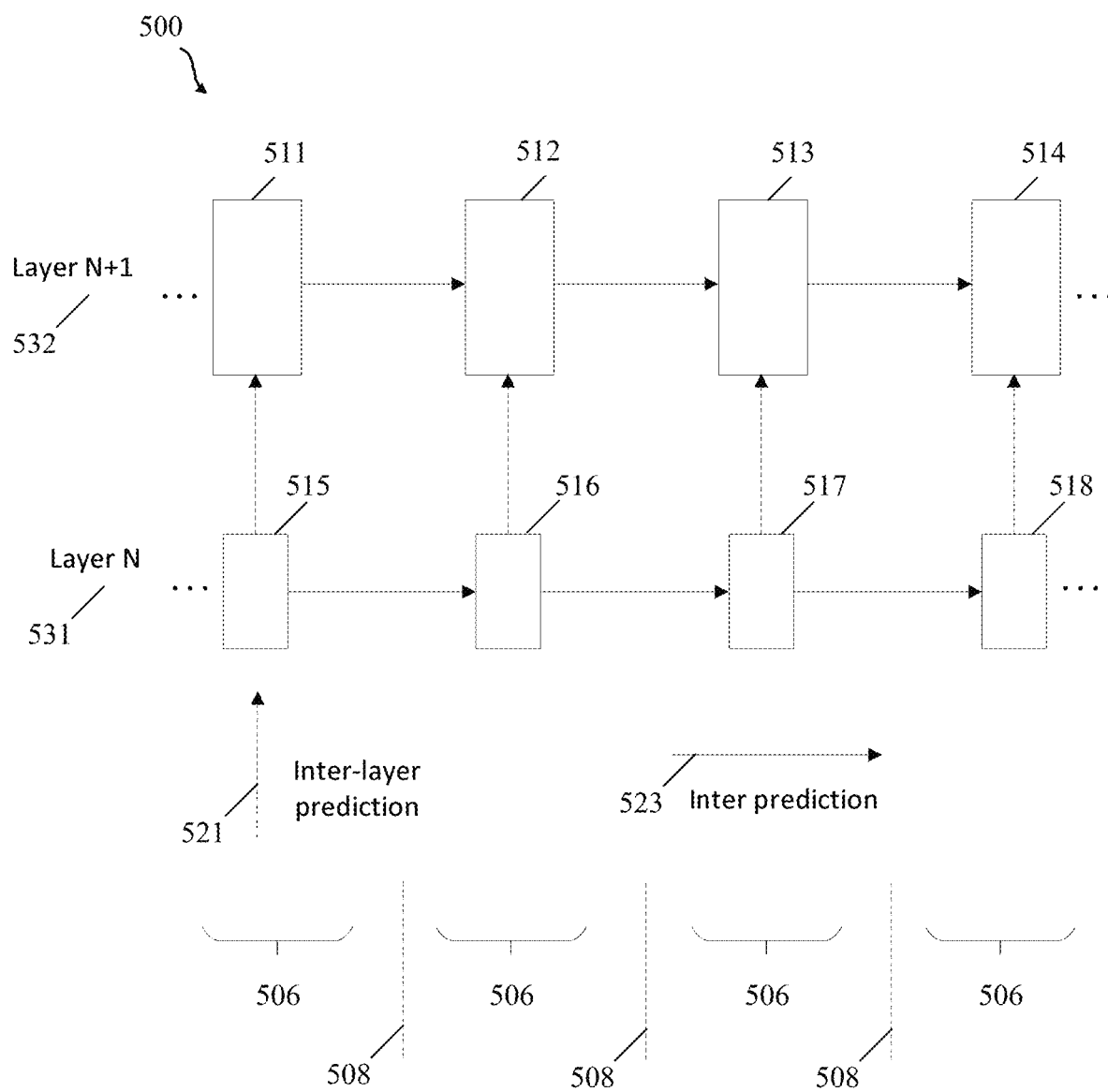
FIG. 5 illustrates an example of multi-layer coding for spatial scalability.

FIG. 5 is a schematic diagram illustrating an example of layer based prediction 500, for example as performed to determine MVs at block compression step 105, block decoding step 113, motion estimation component 221, motion compensation component 219, motion compensation component 321, and/or motion compensation component 421. Layer based prediction 500 is compatible with unidirectional inter-prediction and/or bidirectional inter-prediction, but is also performed between pictures in different layers.

Layer based prediction 500 is applied between pictures 511, 512, 513, and 514 and pictures 515, 516, 517, and 518 in different layers. In the example shown, pictures 511, 512, 513, and 514 are part of layer N+1 532 and pictures 515, 516, 517, and 518 are part of layer N 531. A layer, such as layer N 531 and/or layer N+1 532, is a group of pictures that are all associated with a similar value of a characteristic, such as a similar size, quality, resolution, signal to noise ratio, capability, etc. In the example shown, layer N+1 532 is associated with a larger image size than layer N 531. Accordingly, pictures 511, 512, 513, and 514 in layer N+1 532 have a larger picture size (e.g., larger height and width and hence more samples) than pictures 515, 516, 517, and 518 in layer N 531 in this example. However, such pictures can be separated between layer N+1 532 and layer N 531 by other characteristics. While only two layers, layer N+1 532 and layer N 531, are shown, a set of pictures can be separated into any number of layers based on associated characteristics. Layer N+1 532 and layer N 531 may also be denoted by a layer ID. A layer ID is an item of data that is associated with a picture and denotes the picture is part of an indicated layer. Accordingly, each picture 511-518 may be associated with a corresponding layer ID to indicate which layer N+1 532 or layer N 531 includes the corresponding picture.

Pictures 511-518 in different layers 531-532 are configured to be displayed in the alternative. As such, pictures 511-518 in different layers 531-532 can share the same temporal identifier (ID) when the pictures are included in the same AU. As used herein, an AU is a set of one or more coded pictures associated with the same display time for output from a DPB. For example, a decoder may decode and display picture 515 at a current display time if a smaller picture is desired or the decoder may decode and display picture 511 at the current display time if a larger picture is desired. As such, pictures 511-514 at higher layer N+1 532 contain substantially the same image data as corresponding pictures 515-518 at lower layer N 531 (notwithstanding the difference in picture size). Specifically, picture 511 contains substantially the same image data as picture 515, picture 512 contains substantially the same image data as picture 516, etc.

Pictures 511-518 can be coded by reference to other pictures 511-518 in the same layer N 531 or N+1 532. Coding a picture in reference to another picture in the same layer results in inter-prediction 523, which is compatible unidirectional inter-prediction and/or bidirectional inter-prediction. Inter-prediction 523 is depicted by solid line arrows. For example, picture 513 may be coded by employing inter-prediction 523 using one or two of pictures 511, 512, and/or 514 in layer N+1 532 as a reference, where one picture is referenced for unidirectional inter-prediction and/or two pictures are reference for bidirectional inter-prediction. Further, picture 517 may be coded by employing inter-prediction 523 using one or two of pictures 515, 516, and/or 518 in layer N 531 as a reference, where one picture is referenced for unidirectional inter-prediction and/or two pictures are reference for bidirectional inter-prediction. When a picture is used as a reference for another picture in the same layer when performing inter-prediction 523, the picture may be referred to as a reference picture. For example, picture 512 may be a reference picture used to code picture 513 according to inter-prediction 523. Inter-prediction 523 can also be referred to as intra-layer prediction in a multi-layer context. As such, inter-prediction 523 is a mechanism of coding samples of a current picture by reference to indicated samples in a reference picture that are different from the current picture where the reference picture and the current picture are in the same layer.

Pictures 511-518 can also be coded by reference to other pictures 511-518 in different layers. This process is known as inter-layer prediction 521, and is depicted by dashed arrows. Inter-layer prediction 521 is a mechanism of coding samples of a current picture by reference to indicated samples in a reference picture where the current picture and the reference picture are in different layers and hence have different layer IDs. For example, a picture in a lower layer N 531 can be used as a reference picture to code a corresponding picture at a higher layer N+1 532. As a specific example, picture 511 can be coded by reference to picture 515 according to inter-layer prediction 521. In such a case, the picture 515 is used as an inter-layer reference picture. An inter-layer reference picture is a reference picture used for inter-layer prediction 521. In most cases, inter-layer prediction 521 is constrained such that a current picture, such as picture 511, can only use inter-layer reference picture(s) that are included in the same AU and that are at a lower layer, such as picture 515. When multiple layers (e.g., more than two) are available, inter-layer prediction 521 can encode/decode a current picture based on multiple inter-layer reference picture(s) at lower levels than the current picture.

A video encoder can employ layer based prediction 500 to encode pictures 511-518 via many different combinations and/or permutations of inter-prediction 523 and inter-layer prediction 521. For example, picture 515 may be coded according to intra-prediction. Pictures 516-518 can then be coded according to inter-prediction 523 by using picture 515 as a reference picture. Further, picture 511 may be coded according to inter-layer prediction 521 by using picture 515 as an inter-layer reference picture. Pictures 512-514 can then be coded according to inter-prediction 523 by using picture 511 as a reference picture. As such, a reference picture can serve as both a single layer reference picture and an inter-layer reference picture for different coding mechanisms. By coding higher layer N+1 532 pictures based on lower layer N 531 pictures, the higher layer N+1 532 can avoid employing intra-prediction, which has much lower coding efficiency than inter-prediction 523 and inter-layer prediction 521. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 506 in FIG. 5 may contain several pictures. For example, one AU 506 may contain pictures 511 and 515. Another AU 506 may contain pictures 512 and 516. Indeed, each AU 506 is a set of one or more coded pictures associated with the same display time (e.g., the same temporal ID) for output from a decoded picture buffer (DPB) (e.g., for display to a user). Each AUD 508 is an indicator or data structure used to indicate the start of an AU (e.g., AU 506) or the boundary between AUs.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides supports for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Figure 6:
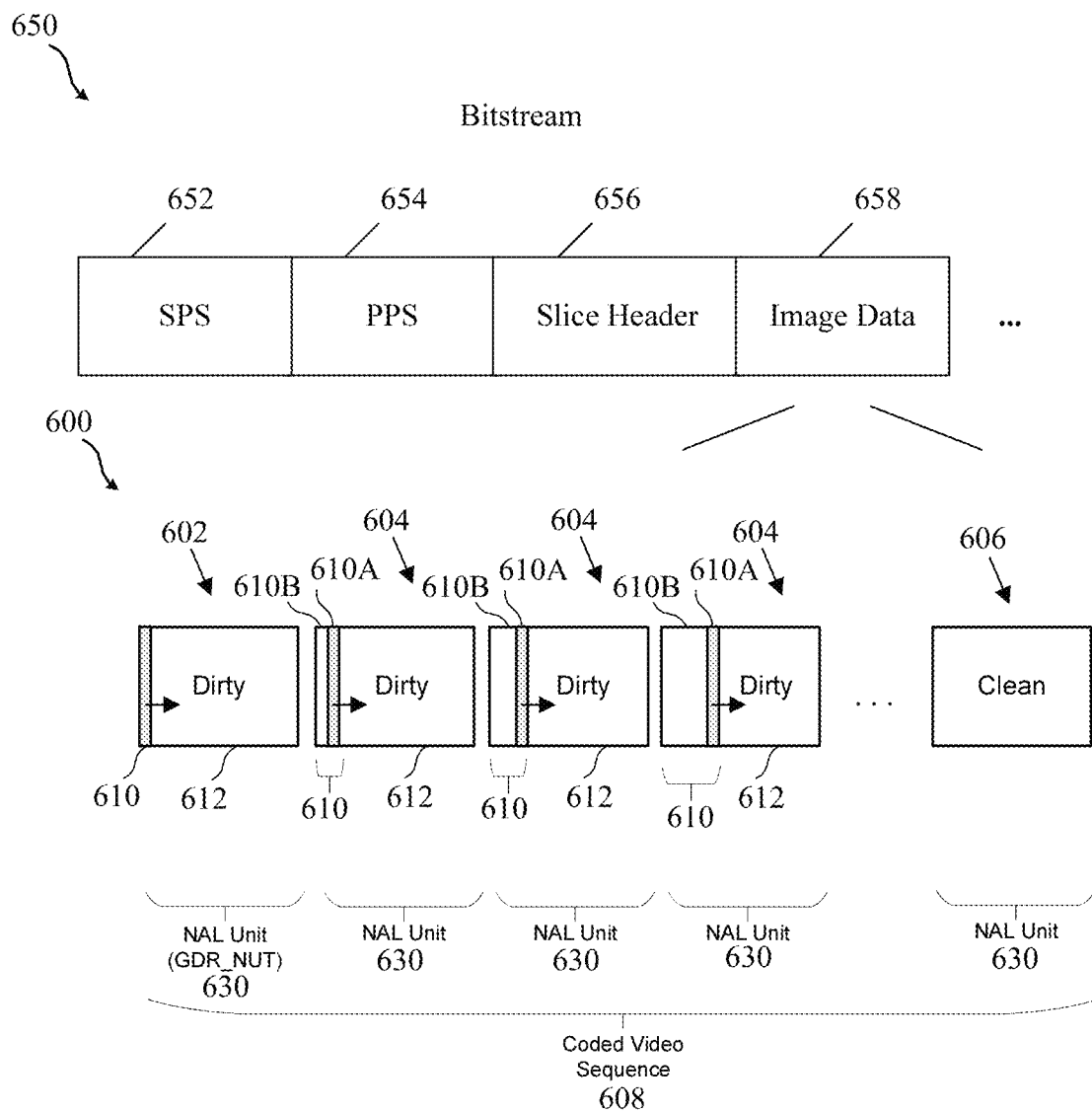
FIG. 6 illustrates a video bitstream configured to implement a gradual decoding refresh (GDR) technique.

FIG. 6 illustrates a video bitstream 650 configured to implement a gradual decoding refresh (GDR) technique 600. As used herein the video bitstream 650 may also be referred to as a coded video bitstream, a bitstream, or variations thereof. As shown in FIG. 6, the bitstream 650 comprises a sequence parameter set (SPS) 652, a picture parameter set (PPS) 654, a slice header 656, and image data 658.

The SPS 652 contains data that is common to all the pictures in a sequence of pictures (SOP). In contrast, the PPS 654 contains data that is common to the entire picture. The slice header 656 contains information about the current slice such as, for example, the slice type, which of the reference pictures will be used, and so on. The SPS 652 and the PPS 654 may be generically referred to as a parameter set. The SPS 652, the PPS 654, and the slice header 656 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures). Those skilled in the art will appreciate that the bitstream 650 may contain other parameters and information in practical applications.

The image data 658 of FIG. 6 comprises data associated with the images or video being encoded or decoded. The image data 658 may be simply referred to as the payload or data being carried in the bitstream 650. In an embodiment, the image data 658 comprises the CVS 608 (or CLVS) containing a GDR picture 602, one or more trailing pictures 604, and a recovery point picture 606. In an embodiment, the GDR picture 602 is referred to as a CVS starting (CVSS) picture. The CVS 608 is a coded video sequence for every coded layer video sequence (CLVS) in the video bitstream 650. Notably, the CVS and the CLVS are the same when the video bitstream 650 includes a single layer. The CVS and the CLVS are only different when the video bitstream 650 includes multiple layers. In an embodiment, the trailing pictures 604 may be considered a form of GDR picture since the trailing pictures precede the recovery point picture 606 in the GDR period.

In an embodiment, the GDR picture 602, the trailing pictures 604, and the recovery point picture 606 may define a GDR period in the CVS 608. In an embodiment, a decoding order begins with the GDR picture 602, continues with the trailing pictures 604, and then proceeds to the recovery picture 606.

The CVS 608 is a series of pictures (or portions thereof) starting with the GDR picture 602 and includes all pictures (or portions thereof) up to, but not including, the next GDR picture or until the end of the bitstream. The GDR period is a series of pictures starting with the GDR picture 602 and includes all pictures up to and including the recovery point picture 606. The decoding process for the CVS 608 always starts at the GDR picture 602.

As shown in FIG. 6, the GDR technique 600 or principle works over a series of pictures starting with the GDR picture 602 and ending with the recovery point picture 606. The GDR picture 602 contains a refreshed/clean region 610 containing blocks that have all been coded using intra prediction (i.e., intra-predicted blocks) and an un-refreshed/dirty region 612 containing blocks that have all been coded using inter prediction (i.e., inter-predicted blocks).

The trailing picture 604 immediately adjacent to the GDR picture 602 contains a refreshed/clean region 610 having a first portion 610A coded using intra prediction and a second portion 610B coded using inter prediction. The second portion 610B is coded by referencing the refreshed/clean region 610 of, for example, a preceeding picture within the GDR period of the CVS 608. As shown, the refreshed/clean region 610 of the trailing pictures 604 expands as the coding process moves or progresses in a consistent direction (e.g., from left to right), which correspondingly shrinks the un-refreshed/dirty region 612. Eventually, the recovery point picture 606, which contains only the refreshed/clean region 610, is obtained from the coding process. Notably, and as will be further discussed below, the second portion 610B of the refreshed/clean region 610, which is coded as inter-predicted blocks, may only refer to the refreshed/clean region 610 in the reference picture.

As shown in FIG. 6, the GDR picture 602, the trailing pictures 604, and the recovery point picture 606 in the CVS 608 are each contained within their own VCL NAL unit 630. The set of VCL NAL units 630 in the CVS 608 may be referred to as an access unit.

In an embodiment, the VCL NAL unit 630 containing the GDR picture 602 in the CVS 608 has a GDR NAL unit type (GDR NUT). That is, in an embodiment the VCL NAL unit 630 containing the GDR picture 602 in the CVS 608 has its own unique NAL unit type relative to the trailing pictures 604 and the recovery point picture 606. In an embodiment, the GDR NUT permits the bitstream 650 to begin with the GDR picture 602 instead of the bitstream 650 having to begin with an intra random access point (IRAP) picture. Designating the VCL NAL unit 630 of the GDR picture 602 as a GDR NUT may indicate to, for example, a decoder that the initial VCL NAL unit 630 in the CVS 608 contains the GDR picture 602. In an embodiment, the GDR picture 602 is the initial picture in the CVS 608. In an embodiment, the GDR picture 602 is the initial picture in the GDR period.

Figure 7:
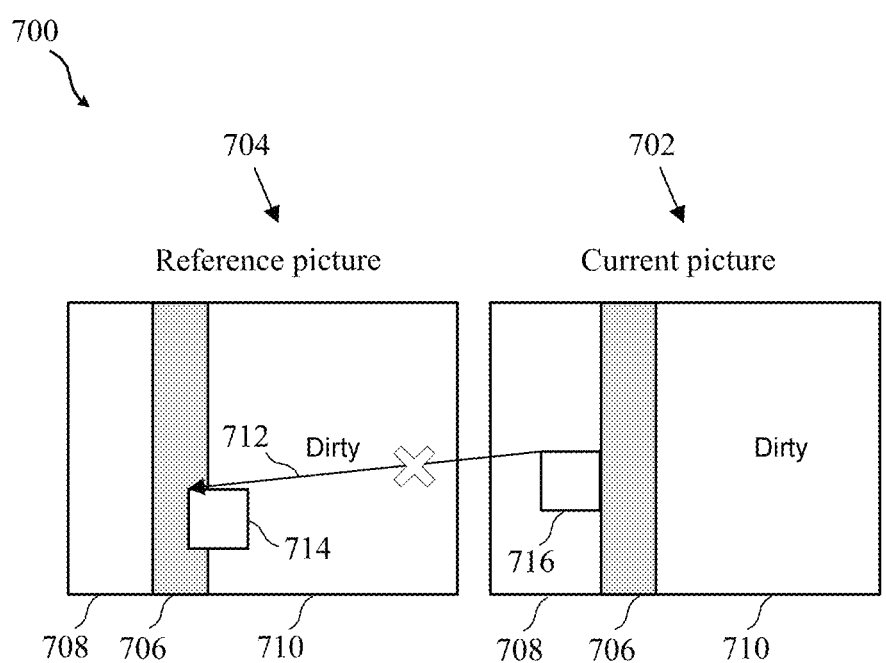
FIG. 7 is a schematic diagram illustrating an undesirable motion search when using the encoder restriction to support GDR.

FIG. 7 is a schematic diagram illustrating an undesirable motion search 700 when using the encoder restriction to support GDR. As shown, the motion search 700 depicts a current picture 702 and a reference picture 704. The current picture 702 and the reference picture 704 each include a refreshed region 706 coded with intra prediction, a refreshed region 708 coded with inter prediction, and an unrefreshed region 710. The refreshed region 706, the refreshed region 708, and the unrefreshed region 710 are slimier to the the first portion 610A of the refreshed/clean region 610, the second portion 610B of the refreshed/clean region 610, and the un-refreshed/dirty region 612 in FIG. 6.

During the motion search 700 process, the encoder is constrained or prevented from selecting any motion vector 712 that results in some of the samples of the reference block 714 being located outside the refreshed region 706. This occurs even when the reference block 714 provides the best rate-distortion cost criteria when predicting the current block 716 in the current picture 702. Thus, FIG. 7 illustrates the reason for non-optimality in the motion search 700 when using the encoder restriction for supporting GDR.

Figure 8:
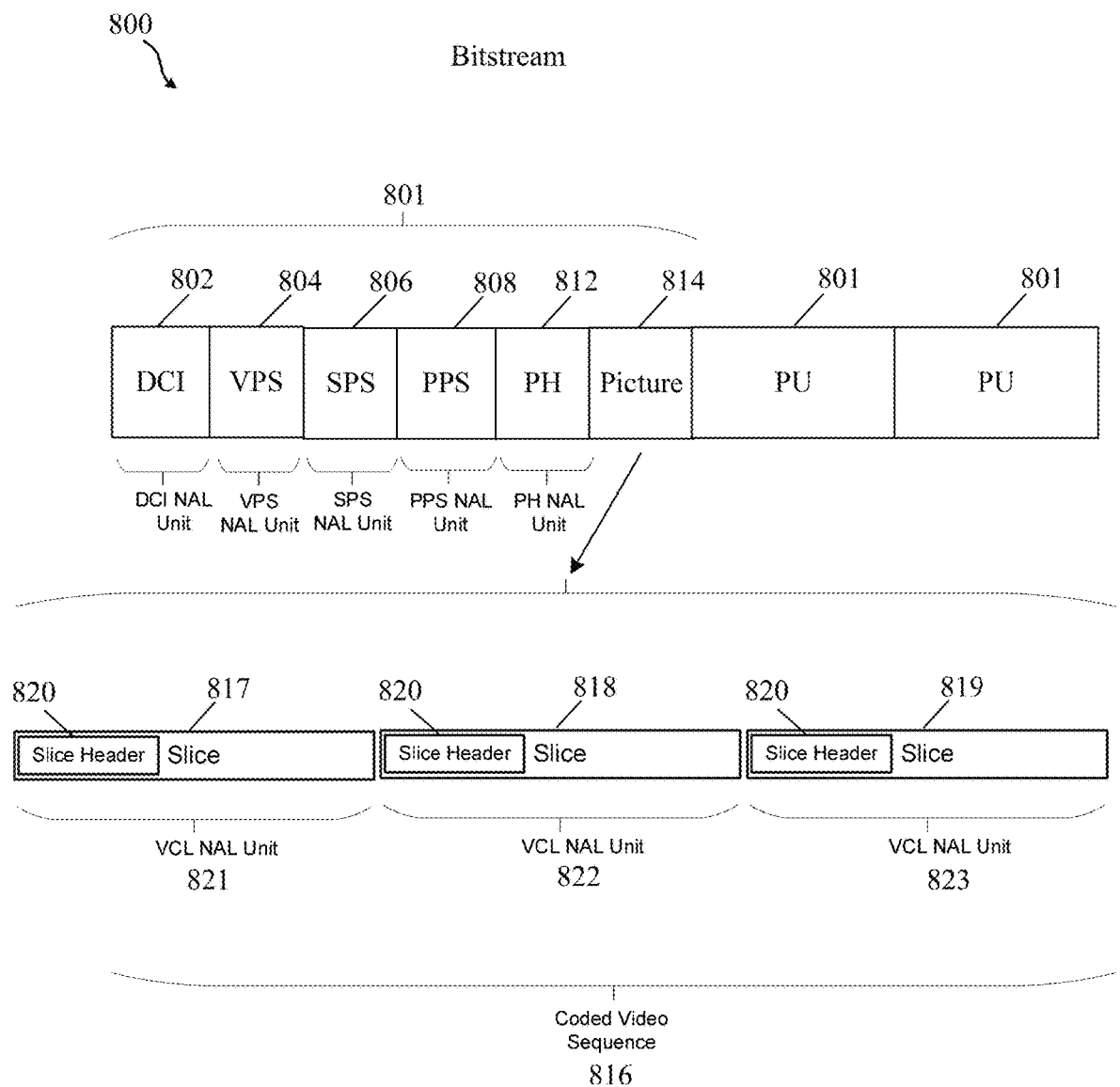
FIG. 8 illustrates an embodiment of a video bitstream.

FIG. 8 illustrates an embodiment of a video bitstream 800. As used herein the video bitstream 800 may also be referred to as a coded video bitstream, a bitstream, or variations thereof. As shown in FIG. 8, the bitstream 800 comprises at least one picture unit (PU) 801. While three of the PUs 801 are shown in FIG. 8, a different number of PUs 801 may be present in the bitstream 800 in practical applications. Each PU 801 is a set of NAL units that are associated with each other according to a specified classification rule, are consecutive in decoding order, and contain exactly one coded picture (e.g., picture 814).

In an embodiment, each PU 801 contains one or more of the following: a decoding capability information (DCI) 802, a video parameter set (VPS) 804, a sequence parameter set (SPS) 806, a picture parameter set (PPS) 808, a picture header (PH) 812, and a picture 814. Each of the DCI 802, the VPS 804, the SPS 806, and the PPS 808 may be generically referred to as a parameter set. In an embodiment, other parameter sets not shown in FIG. 8 may also be included in the bitstream 800 such as, for example, an adaption parameter set (APS), which is a syntax structure containing syntax elements that apply to zero or more slices as determined by zero or more syntax elements found in slice headers.

The DCI 802, which may also be referred to a decoding parameter set (DPS) or decoder parameter set, is a syntax structure containing syntax elements that apply to the entire bitstream. The DCI 802 includes parameters that stay constant for the lifetime of the video bitstream (e.g., bitstream 800), which can translate to the lifetime of a session. The DCI 802 can include profile, level, and sub-profile information to determine a maximum complexity interop point that is guaranteed to be never exceeded, even if splicing of video sequences occurs within a session. It further optionally includes constraint flags, which indicate that the video bitstream will be constraint of the use of certain features as indicated by the values of those flags. With this, a bitstream can be labelled as not using certain tools, which allows among other things for resource allocation in a decoder implementation. Like all parameter sets, the DCI 802 is present when first referenced, and referenced by the very first picture in a video sequence, implying that it has to be sent among the first NAL units in the bitstream. While multiple DCIs 802 can be in the bitstream, the value of the syntax elements therein cannot be inconsistent when being referenced.

The VPS 804 includes decoding dependency or information for reference picture set construction of enhancement layers. The VPS 804 provides an overall perspective or view of a scalable sequence, including what types of operation points are provided, the profile, tier, and level of the operation points, and some other high-level properties of the bitstream that can be used as the basis for session negotiation and content selection, etc.

The SPS 806 contains data that is common to all the pictures in a sequence of pictures (SOP). The SPS 806 is a syntax structure containing syntax elements that apply to zero or more entire CLVSs as determined by the content of a syntax element found in the PPS referred to by a syntax element found in each picture header. In contrast, the PPS 808 contains data that is common to the entire picture. The PPS 808 is a syntax structure containing syntax elements that apply to zero or more entire coded pictures as determined by a syntax element found in each picture header (e.g., PH 812).

The DCI 802, the VPS 804, the SPS 806, and the PPS 808 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the DCI 802 is contained in a non-VCL NAL unit designated as a DCI NAL unit or a DPS NAL unit. That is, the DCI NAL unit has a DCI NAL unit type (NUT) and the DPS NAL unit has a DPS NUT. In an embodiment, the VPS 804 is contained in a non-VCL NAL unit designated as a VPS NAL unit. Therefore, the VPS NAL unit has a VPS NUT. In an embodiment, the SPS 806 is a non-VCL NAL unit designated as a SPS NAL unit. Therefore, the SPS NAL unit has an SPS NUT. In an embodiment, the PPS 808 is contained in a non-VCL NAL unit designated as a PPS NAL unit. Therefore, the PPS NAL unit has a PPS NUT.

The PH 812 is a syntax structure containing syntax elements that apply to all slices (e.g., slices 817-819) of a coded picture (e.g., picture 814). In an embodiment, the PH 812 is in a new type of non-VCL NAL unit designated as a PH NAL unit. Therefore, the PH NAL unit has a PH_NUT (e.g., PH_NUT). In an embodiment, there is one and only one PH 812 included in each PU 801. That is, the PU 801 contains a single or lone PH 812. In an embodiment, exactly one PH NAL unit is present for each picture 801 in the bitstream 800.

In an embodiment, the PH NAL unit associated with the PH 812 has a temporal ID and a layer ID. The temporal ID indicates the position of the PH NAL unit, in time, relative to the other PH NAL units in the bitstream (e.g., bitstream 801). The layer ID indicates the layer (e.g., layer 531 or layer 532) that contains the PH NAL unit. In an embodiment, the temporal ID is similar to, but different from, the POC. The POC uniquely identifies each picture in order. In a single layer bitstream, temporal ID and POC would be the same. In a multi-layer bitstream (e.g., see FIG. 5), pictures in the same AU would have different POCs, but the same temporal ID.

In an embodiment, the picture 814 is partitioned into slices, namely a first slice 817, a second slice 818, and a third slice 819. The first slice 817 is carried in a first VCL NAL unit 821, the second slice 818 is carried in a second VCL NAL unit 822, and the third slice 819 is carried in a third VCL NAL unit. While three slices 817-819 and three VCL NAL units 821-823 are shown in FIG. 8, the picture 814 may be partitioned into a different number of slices carried in a different number of NAL units in practical applications.

In an embodiment, the PH NAL unit precedes the first VCL NAL unit 821 containing the first slice 817 of the associated picture 814. This establishes the association between the PH 812 and the slices 817-819 of the picture 814 associated with the PH 812 without the need to have a picture header ID signaled in the PH 812 and referred to from the slice header 820. Consequently, it can be inferred that all VCL NAL units between two PHs 812 belong to the same picture 814 and that the picture 814 is associated with the first PH 812 in the same PU 801 between the two PHs 812. In an embodiment, the first VCL NAL unit 821 that follows a PH 812 contains the first slice 817 of the picture 814 (e.g., the slice from the top left corner of the picture) associated with the PH 812 and contained in the PU.

In an embodiment, the PH NAL unit follows picture level parameter sets (e.g., the PPS) or higher level parameter sets such as the DCI (a.k.a., the DPS), the VPS, the SPS, the PPS, etc. having both a temporal ID and a layer ID less than the temporal ID and layer ID of the PH NAL unit, respectively. Consequently, those parameter sets are not repeated within a picture or an access unit. Because of this ordering, the PH 812 can be resolved immediately. That is, parameter sets that contain parameters relevant to an entire picture are positioned in the bitstream before the PH NAL unit. Anything that contains parameters for part of a picture is positioned after the PH NAL unit.

In one alternative, the PH NAL unit follows picture level parameter sets and prefix supplemental enhancement information (SEI) messages, or higher level parameter sets such as the DCI (a.k.a., the DPS), the VPS, the SPS, the PPS, the APS, the SEI message, etc.

In an embodiment, the PH 812 may contain a syntax element (e.g., a flag, etc.) that specifies the picture type of the picture 814 associated with the PH 812. The picture type may include, but is not limited to, the following types: an instantaneous decoder refresh (IDR) picture, a clean random access (CRA) picture, a GDR picture, a non-TRAP picture that is a non-GDR picture and contains only intra predicted slices (I-slices), a non-TRAP picture that is a non-GDR picture and contains only uni-directional inter predicted slices (P-slices) and I-slices, and a non-IRAP picture that is a non-GDR picture and contains only bi-directional inter predicted slices (B-slices), P-slices, and I-slices. Thus, a single flag in a PH 812 is able to indicate whether all slices (e.g., slices 817-819) in a picture (e.g., picture 814) are, for example, slices of a GDR picture (e.g., GDR picture 602). This also supports signaling of the recovery point picture order count (POC) for the GDR picture once in the PH 812 instead of in every slice header (e.g., slice header 820).

In an embodiment, one or more syntax elements are signaled in the PH 812 instead of the slice headers 820 of the picture 814 associated with the PH 812. Those syntax elements are a PPS ID referred to by the picture 814, a flag specifying whether the picture 814 is a reference picture or not, a color plane of the picture 814, a POC least significant bit (LSB) of the picture 814, a recovery point POC if the picture 814 is a GDR picture (e.g., GDR picture 602), a flag specifying whether pictures prior to the picture 814 are output, and a flag specifying whether the picture is an output picture or not. The PPS ID is an identifier that identifies a particular PPS for the picture 814. The color plane of the picture 814 comprises the luma and chroma components (e.g., Y, Cb, and Cr, etc.) for the picture 814. The POC LSB is the bit (or bits) that identify the POC. The POC is a variable that is associated with each picture (e.g., picture 814), uniquely identifies the associated picture among all pictures in the CLVS, and, when the associated picture is to be output from the DPB, indicates the position of the associated picture in output order relative to the output order positions of the other pictures in the same CLVS that are to be output from the DPB. The recovery point POC is a POC that identifies the recovery point and, consequently, the recovery point picture.

Moving these syntax elements from the slice headers 820 to the PH 812 allows the syntax elements to be signaled once for the entire picture 814 instead of repeating the syntax elements in each slice header 820. This reduces redundancy and increases coding efficiency.

The picture 814 is an array of luma samples in monochrome format or an array of luma samples and two corresponding arrays of chroma samples in 4:2:0, 4:2:2, and 4:4:4 colour format. In an embodiment, there is one and only one picture 814 included in each PU 801. As such, there is only one PH 812 and only one picture 814 corresponding to that PH 812 in each PU 801. That is, the PU 801 contains a single or lone picture 814.

The picture 814 may be either a frame or a field. However, in one CVS 816, either all pictures 814 are frames or all pictures 814 are fields. The CVS 816 is a coded video sequence for every coded layer video sequence (CLVS) in the video bitstream 800. Notably, the CVS 816 and the CLVS are the same when the video bitstream 800 includes a single layer. The CVS 816 and the CLVS are only different when the video bitstream 800 includes multiple layers (e.g., as shown in FIG. 5).

The PUs 801 may collectively comprise a CLVS. A CLVS is sequence of PUs 801 with the same value of nuh_layer_id that consists, in decoding order, of a coded layer video sequence start (CLVSS) PU, followed by zero or more PUs 801 that are not CLVSS PUs, including all subsequent PUs 801 up to but not including any subsequent PU 801 that is a CLVSS PU. A CLVSS PU is a PU 801 in which the coded picture (e.g., picture 814) is a CLVSS picture. A CLVSS picture is a coded picture that is IRAP picture with a NoOutputBeforeRecoveryFlag equal to 1 or a GDR picture (e.g., GDR picture 602) with NoOutputBeforeRecoveryFlag equal to 1.

Each picture 814 contains one or more slices 817-819. A slice 817-819 is an integer number of complete tiles or an integer number of consecutive complete CTU rows within a tile of a picture (e.g., picture 814). Each slice 817-819 is exclusively contained in a single NAL unit (e.g., a VCL NAL unit). Indeed, slice 817 is contained in VCL NAL unit 821, slice 818 is contained in VCL NAL unit 822, and slice 819 is contained in VCL NAL unit 823. A tile (not shown) is a rectangular region of CTUs within a particular tile column and a particular tile row in a picture (e.g., picture 814). A tile is a partitioned portion of a picture created by horizontal and vertical boundaries. Tiles may be rectangular and/or square. Specifically, a tile includes four sides that are connected at right angles. The four sides include two pair of parallel sides. Further, the sides in a parallel side pair are of equal length. As such, a tile may be any rectangular shape, where a square is a special case of a rectangle where all four sides are of equal length. An image/picture can contain one or more tiles. A CTU (not shown) is a CTB of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 817-819 contains a slice header 820. A slice header 820 is the part of the coded slice 817-819 containing the data elements pertaining to all tiles or CTU rows within a tile represented in the slice 817-819. That is, the slice header 820 contains information about the slice 817-819 such as, for example, the slice type, which of the reference pictures will be used, and so on. The PH ID is referred to by a slice header corresponding to the slices.

The pictures 814 and their slices 817-819 comprise data associated with the images or video being encoded or decoded. Thus, the pictures 814 and their slices 817-819 may be simply referred to as the payload or data being carried in the bitstream 800.

Those skilled in the art will appreciate that the bitstream 800 may contain other parameters and information in practical applications.

Figure 9:
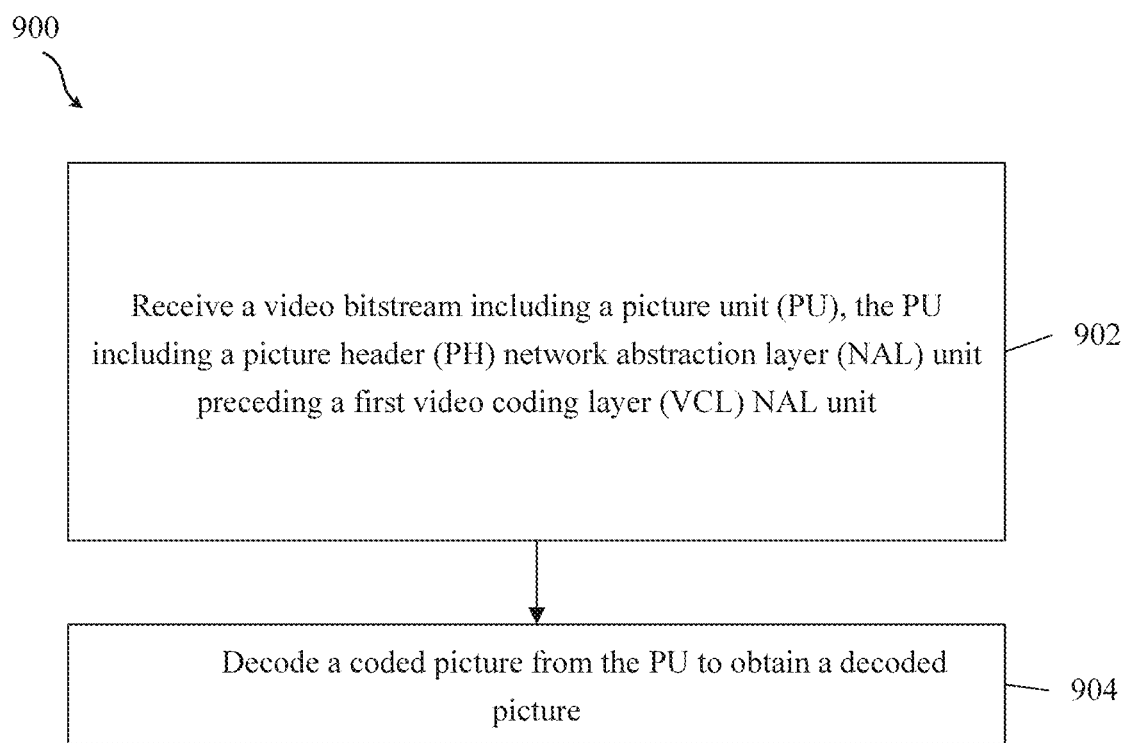
FIG. 9 is an embodiment of a method of decoding a coded video bitstream.

FIG. 9 is an embodiment of a method 900 of decoding implemented by a video decoder (e.g., video decoder 400). The method 900 may be performed after a bitstream has been directly or indirectly received from a video encoder (e.g., video encoder 300). The method 900 improves the decoding process by ensuring that a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

In block 902, the video decoder receives a video bitstream (e.g., video bitstream 800) including a PU (e.g., PU 801). The PU contains a PH NAL unit preceding a first VCL NAL unit (e.g., VCL NAL unit 821). That is, the PH NAL unit is positioned or located chronologically or temporally before or prior to the first VCL NAL unit in the PU. In an embodiment, the PH NAL unit in the PU precedes each VCL NAL unit (e.g., VCL NAL units 821-823) in the PU inclusive of the first VCL NAL unit (VCL NAL unit 821). As used herein, the first VCL NAL unit means the first or initial VCL NAL unit within the PU. As such, all of the slices (e.g., slices 817-819) in the PU are contained in VCL NAL units and therefore follow the PH.

In an embodiment, the PU contains only one PH (e.g., PH 812). In an embodiment, the coded picture (e.g., picture 814) is the only picture in the PU. In an embodiment, the NAL unit contains a PH (e.g., PH 812). In an embodiment, the first VCL NAL unit contains a slice of the coded picture.

In an embodiment, the PH NAL unit is a non-VCL NAL unit. In an embodiment, the PH NAL unit contains the only one PH. In an embodiment, the only one PH in the PH NAL unit contains syntax elements that apply to all slices of the coded picture. In an embodiment, the PH NAL unit has a PH NAL unit type (PH_NUT).

In block 904, the video decoder decodes the coded picture from the PU to obtain a decoded picture. In an embodiment, decoding the PU comprises decoding the various slices 818 of the picture 814 in accordance with the information or instructions in one or more of the DCI 802, the VPS 804, the SPS 806, the PPS 808, the PH 812, and the slice header 820. Once decoded, the picture 814 may be used to generate or produce an image or video sequence for display to a user on the display or screen of an electronic device (e.g., a smart phone, tablet, laptop, personal computer, etc.).

Figure 10:
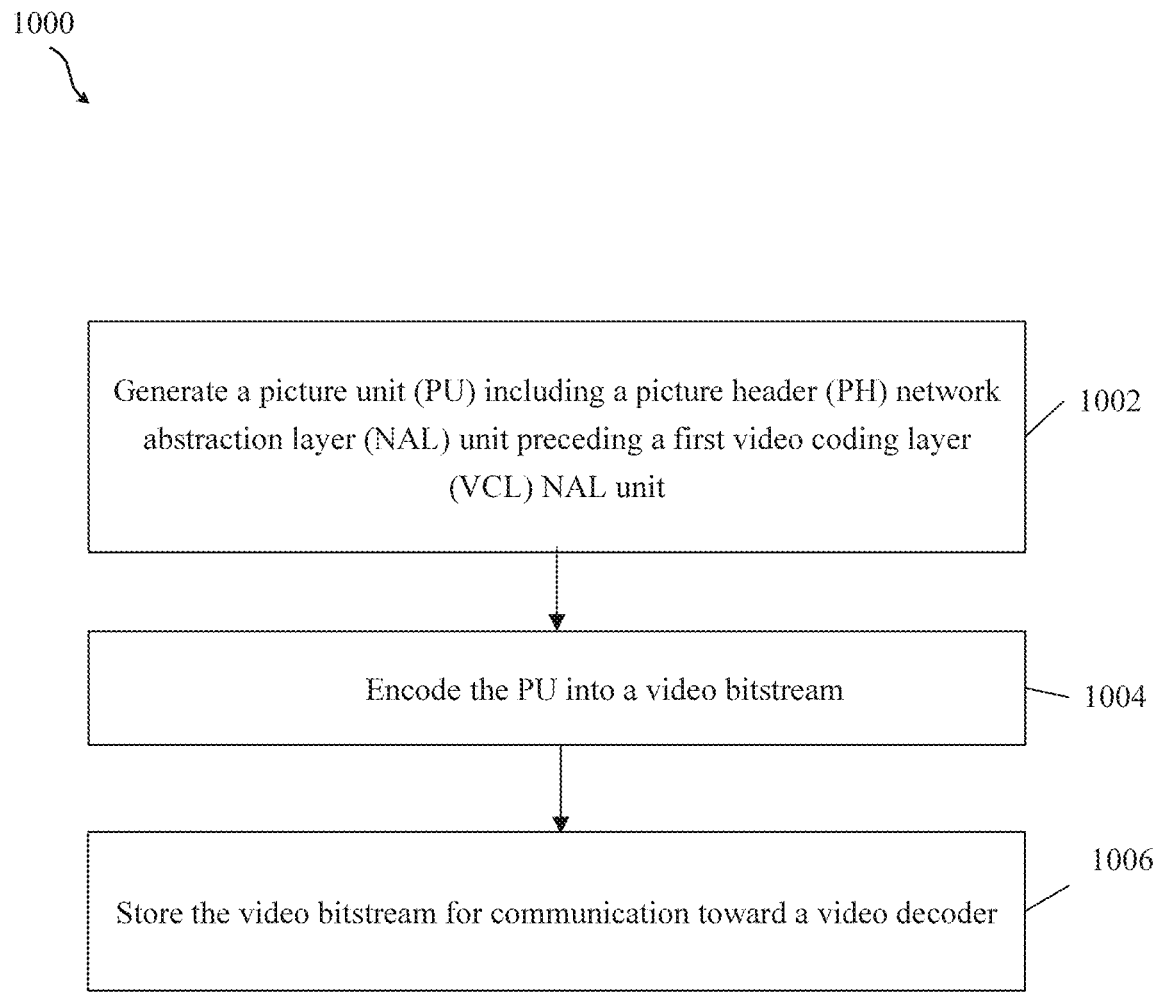
FIG. 10 is an embodiment of a method of encoding a coded video bitstream.

FIG. 10 is an embodiment of a method 1000 of encoding a video bitstream implemented by a video encoder (e.g., video encoder 300). The method 1000 may be performed when a picture (e.g., from a video) is to be encoded into a video bitstream and then transmitted toward a video decoder (e.g., video decoder 400). The method 1000 improves the encoding process ensuring that a picture header (PH) network abstraction layer (NAL) unit precedes a first video coding layer (VCL) NAL unit in a picture unit (PU). This establishes the association between a picture header (PH) in the PH NAL unit and slices of a picture associated with the PH without having to signal a PH identifier (ID) in the PH. By not signaling the PH ID, one or more bits may be removed from the bitstream for each picture, which adds up over a long video sequence. By eliminating these bits, coding efficiency is improved. In addition, the encoder/decoder can easily infer that all VCL NAL units between two picture headers belong to the same picture, that the picture is associated with the first PH between the two PHs, and that the first VCL NAL unit that follows a PH contains the first slice of the picture associated with the picture header. Thus, the coder/decoder (a.k.a., "codec") in video coding is improved relative to current codecs. As a practical matter, the improved video coding process offers the user a better user experience when videos are sent, received, and/or viewed.

In block 1002, the video encoder generates a PU (e.g., PU 801). The PU contains a PH NAL unit preceding a first VCL NAL unit of the PU. That is, the PH NAL unit is positioned or located chronologically or temporally before or prior to the first VCL NAL unit (e.g., VCL NAL unit 821) in the PU. In an embodiment, the PH NAL unit in the PU precedes each VCL NAL unit (e.g., VCL NAL units 821-823) in the PU inclusive of the first VCL NAL unit (e.g., VCL NAL unit 821). As used herein, the first VCL NAL unit means the first or initial VCL NAL unit within the PU. As such, all of the slices (e.g., slices 817-819) in the PU are contained in VCL NAL units and therefore follow the PH.

In an embodiment, the NAL unit is a PH NAL unit. In an embodiment, the NAL unit is a non-VCL NAL unit. In an embodiment, the NAL unit contains a PH (e.g., PH 812).

In an embodiment, the PU contains only one PH and a coded picture (e.g., picture 814). In an embodiment, the coded picture is the only picture in the PU. In an embodiment, the PH NAL unit in the PU precedes each VCL NAL unit in the PU inclusive of the first VCL NAL unit. In an embodiment, the first VCL NAL unit contains a slice (e.g., slice 818) of the coded picture. In an embodiment, the PH NAL unit has a PH NAL unit type (PH_NUT).

In block 1004, the video encoder encodes the PU into a video bitstream (e.g., the bitstream 800). In block 1006, the video encoder stores the video bitstream for communication toward a video decoder. The video bitstream may be stored in memory until the video bitstream is transmitted toward the video decoder. Once received by the video decoder, the encoded video bitstream may be decoded (e.g., as described above) to generate or produce an image or video sequence for display to a user on the display or screen of an electronic device (e.g., a smart phone, tablet, laptop, personal computer, etc.).

The following syntax and semantics may be employed to implement the embodiments disclosed herein. The following description is relative to the basis text, which is the latest VVC draft specification. In other words, only the delta is described, while the text in the basis text that are not mentioned below apply as they are. Added text relative to the basis text is shown in bold, and removed text is shown in italics.

The picture header RBSP syntax.

|  | Descriptor |
|---|---|
| picture_header_rbsp( ) { |  |
|   pic_type | u(3) |
|   pic_parameter_set_id | ue(v) |
|   non_reference_picture_flag | u(1) |
|   if( separate_colour_plane_flag = = 1 ) |  |
|     colour_plane_id | u(2) |

-continued

| | Descriptor |
|---|---|
| pic_order_cnt_lsb | u(v) |
| if( pic_type = = 2 ) | |
|   recovery_poc_cnt | ue(v) |
| if(pic_type = = 0 \|\| pic_type = = 1 \|\| pic_type = = 2 ) | |
|   no_output_of_prior_pics_flag | u(1) |
| if( output_flag_present_flag ) | |
|   pic_output_flag | u(1) |
| if ( pic_type != 0 && pic_type != 1 && pic_type != 3 ) | |
|   if( sps_temporal_mvp_enabled_flag && !pps_temporal_mvp_enabled_idc ) | |
|     pic_temporal_mvp_enabled_flag | u(1) |
| rbsp_trailing_bits( ) | |
| } | |

The slice header RBSP syntax.

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   *non_reference_picture_flag* | *u(1)* |
|   if( pic_type != 0 && pic_type != 1 && pic_type != 3 ) | |
|     slice_type | ue(v) |
|   if( separate_colour_plane_flag = = 1 ) | |
|     colour_plane_id | u(2) |
|   slice_pic_order_cnt_lsb | u(v) |
|   if( nal_unit_type = = GDR_NUT ) | |
|     recovery_poc_cnt | ue(v) |
|   if( nal_unit_type = = IDR_W_RADL \|\| nal_unit_type = = IDR_N_LP \|\| nal_unit_type = = CRA_NUT \|\| nal_unit_type = = GDR_NUT ) | |
|     no_output_of_prior_pics_flag | u(1) |
|   if( output_flag_present_flag ) | |
|     pic_output_flag | u(1) |
|   ... | |
|   if( slice_type != I ) { | |
|     if( sps_temporal_mvp_enabled_flag && !pps_temporal_mvp_enabled_idc ) | |
|       slice_temporal_mvp_enabled_flag | u(1) |
|     if( slice_type = = B && !pps_mvd_l1_zero_idc ) | |
|       mvd_l1_zero_flag | u(1) |
|   } | |
|   ... | |
| } | |

The picture header RBSP semantics.

The picture header contains information that is common for all slices of the coded picture for which the next VCL NAL unit in decoding order is the first coded slice.

pic_type indicates the characterization of the coded pictures as listed in Table 7-3 for the given value of pic_type. The value of pic_type shall be equal to 0 to 5, inclusive, in bitstreams conforming to this version of this Specification. Other values of pic_type are reserved for future use by ITU-T|ISO/IEC. Decoders conforming to this version of this Specification shall ignore reserved values of pic_type.

TABLE 7-3

Interpretation of pic_type

| pic_type | characterization of the coded picture |
|---|---|
| 0 | The coded picture is an IDR picture. |
| 1 | The coded picture is a CRA picture. |
| 2 | The coded picture is a GDR picture. |

TABLE 7-3-continued

Interpretation of pic_type

| pic_type | characterization of the coded picture |
|---|---|
| 3 | The coded picture is a non-IRAP, non-GDR picture and contains I slices only. |
| 4 | The coded picture is a non-IRAP, non-GDR picture and contains P and I slices only. |
| 5 | The coded picture is a non-IRAP, non-GDR picture and contains B, P, and I slices. | pic_parameter_set_id specifies the value of pps_pic_parameter_set_id for the PPS in use. The value of pic_parameter_set_id shall be in the range of 0 to 63, inclusive.

non_reference_picture_flag equal to 1 specifies the picture associated with the picture header is never used as a reference picture. non_reference_picture_flag equal to 0 specifies the picture may or may not be used as a reference picture.

colour_plane_id specifies the colour plane associated with the picture associated with the picture header when separate_colour_plane_flag is equal to 1. The value of colour_plane_id shall be in the range of 0 to 2, inclusive. colour_plane_id values 0, 1 and 2 correspond to the Y, Cb and Cr planes, respectively.

NOTE—: There is no dependency between the decoding processes of pictures having different values of colour_plane_id.

pic_order_cnt_lsb specifies the picture order count modulo MaxPicOrderCntLsb for the picture associated with the picture header. The length of the pic_order_cnt_lsb syntax element is log 2_max_pic_order_cnt_lsb_minus4+4 bits. The value of the pic_order_cnt_lsb shall be in the range of 0 to MaxPicOrderCntLsb−1, inclusive.

recovery_poc_cnt specifies the recovery point of decoded pictures in output order. If there is a picture picA that follows the current GDR picture in decoding order in the CVS and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

The variable RpPicOrderCntVal is derived as follows:

$$RpPicOrderCntVal = PicOrderCntVal + recovery\_poc\_cnt \quad (7\text{-}94)$$

no_output_of_prior_pics_flag affects the output of previously-decoded pictures in the decoded picture buffer after the decoding of a CLVSS picture that is not the first picture in the bitstream as specified in Annex C.

pic_output_flag affects the decoded picture output and removal processes as specified in Annex C. When pic_output_flag is not present, it is inferred to be equal to 1.

pic_temporal_mvp_enabled_flag specifies whether temporal motion vector predictors can be used for inter prediction. If pic_temporal_mvp_enabled_flag is equal to 0, the syntax elements of the picture associated with the picture header shall be constrained such that no temporal motion vector predictor is used in decoding of the picture. Otherwise (pic_temporal_mvp_enabled_flag is equal to 1), temporal motion vector predictors may be used in decoding of the picture.

When pic_temporal_mvp_enabled_flag is not present, the following applies:

If sps_temporal_mvp_enabled_flag is equal to 0, the value of pic_temporal_mvp_enabled_flag is inferred to be equal to 0.

Otherwise (sps_temporal_mvp_enabled_flag is equal to 1), the value of pic_temporal_mvp_enabled_flag is inferred to be equal to pps_temporal_mvp_enabled_idc−1.

The NAL unit header semantics.

nuh_layer_id specifies the identifier of the layer to which a VCL NAL unit belongs or the identifier of a layer to which a non-VCL NAL unit applies.

The value of nuh_layer_id shall be the same for all VCL NAL units of a coded picture. The value of nah_layer_id of a coded picture or a layer access unit is the value of the nah_layer_id of the VCL NAL units of the coded picture or the layer access unit.

When nal_unit_type is equal to PH_NUT, the value of nuh_layer_id shall be equal to the value of nuh_layer_id of the VCL NAL units of the layer access unit containing the picture header NAL unit.

nuh_temporal_id_plus1 minus 1 specifies a temporal identifier for the NAL unit.

The value of nuh_temporal_id_plus1 shall not be equal to 0.

The variable TemporalId is derived as follows:

$$TemporalId = \text{nuh\_temporal\_id\_plus1} - 1 \quad (7\text{-}1)$$

When nal_unit_type is in the range of IDR_W_RADL to RSV_IRAP_VCL13, inclusive, TemporalId shall be equal to 0.

When nal_unit_type is equal to STSA_NUT, TemporalId shall not be equal to 0.

The value of TemporalId shall be the same for all VCL NAL units of a layer access unit. The value of TemporalId of a coded picture or a layer access unit is the value of the TemporalId of the VCL NAL units of the coded picture or the layer access unit. [Ed. (YK): Check whether all layer AUs in an AU should be required to have the same value of TemporalId.] The value of TemporalId of a sub-layer representation is the greatest value of TemporalId of all VCL NAL units in the sub-layer representation.

The value of TemporalId for non-VCL NAL units is constrained as follows:

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4 . . . 7 | RSV_VCL4 . . . RSV_VCL7 | Reserved non-IRAP VCL NAL unit types | VCL |
| 8 | IDR_W_RADL | Coded slice of an IDR picture | VCL |
| 9 | IDR_N_LP | slice_layer_rbsp( ) | |
| 10 | CRA_NUT | Coded slice of a CRA picture silce_layer_rbsp( ) | VCL |
| 11 | GDR_NUT | Coded slice of a GDR picture slice_layer_rbsp( ) | VCL |
| 12 | RSV_IRAP_VCL12 | Reserved IRAP VCL NAL unit types | VCL |
| 13 | RSV_IRAP_VCL13 | | |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | PH_NUT | Picture header picture_header_rbsp( ) | non-VCL |
| 20 | EOS_NUT | End of sequence end_of_seq_rbsp( ) | non-VCL |
| 21 | EOB_NUT | End of bit stream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 . . . 27 | RSV_NVCL25 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

If nal_unit_type is equal to DPS_NUT, VPS_NUT, or SPS_NUT, TemporalId is equal to 0 and the TemporalId of the layer access unit containing the NAL unit shall be equal to 0.

Otherwise, if nal_unit_type is equal to PH_NUT, TemporalId shall be equal to the TemporalId of the layer access unit containing the NAL unit.

Otherwise, when nal_unit_type is not equal to EOS_NUT and not equal to EOB_NUT, TemporalId shall be greater than or equal to the TemporalId of the layer access unit containing the NAL unit.

NOTE 5—When the NAL unit is a non-VCL NAL unit, the value of TemporalId is equal to the minimum value of the TemporalId values of all layer access units to which the non-VCL NAL unit applies. When nal_unit_type is equal to PPS NUT or APS NUT, TemporalId may be greater than or equal to the TemporalId of the containing layer access unit, as all PPSs and APSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

Order of NAL units and coded pictures and their association to layer access units and access units.

This clause specifies the order of NAL units and coded pictures and their association to layer access units and access units for CVSs that conform to one or more of the profiles specified in Annex A and that are decoded using the decoding process specified in clauses 2 through 10.

A layer access unit consists of one picture header NAL unit, one coded picture, which comprises of one or more VCL NAL units, and zero or more VCL NAL units and zero or more non-VCL NAL units. The association of VCL NAL units to coded pictures is described in clause 7.4.2.4.4.

An access unit consists of an access unit delimiter NAL unit and one or more layer access units in increasing order of nuh_layer_id.

The first access unit in the bitstream starts with the first NAL unit of the bitstream.

Let firstPicHeaderNalUnitInAu be a picture header NAL unit that is the picture header of the first coded picture for which the derived PicOrderCntVal differs from the PicOrderCntVal of the previous coded picture. The first of any of the following NAL units preceding firstPicHeaderNalUnitInAu and succeeding the last VCL NAL unit preceding firstPicHeaderNalUnitInAu, if any, specifies the start of a new access unit:
  DPS NAL unit (when present),
  VPS NAL unit (when present),
  SPS NAL unit (when present),
  PPS NAL unit (when present),
  APS NAL unit (when present),
  Prefix SEI NAL unit (when present),
  NAL units with nal_unit_type in the range of RSV_NVCL_25 . . . RSV_NVCL_26 (when present),
  NAL units with nal_unit_type in the range of UNSPEC28 . . . UNSPEC29 (when present).

NOTE—The first NAL unit preceding firstPicHeaderNalUnitInAu and succeeding the last VCL NAL unit preceding firstPicHeaderNalUnitInAu, if any, can only be one of the above-listed NAL units.

When there is none of the above NAL units preceding firstPicHeaderNalUnitInAu and succeeding the last VCL NAL preceding firstPicHeaderNalUnitInAu, if any, firstPicHeaderNalUnitInAu starts a new access unit.

The order of the coded pictures and non-VCL NAL units within a layer access unit or an access unit shall obey the following constraints:
  Each layer access unit shall include one and only one picture header NAL unit, which shall precede the first VCL NAL unit of the layer access unit.
  When any DPS NAL units, VPS NAL units, SPS NAL units, or PPS NAL units are present in a layer access unit, they shall precede the picture header NAL unit of the layer access unit.
  When any APS NAL units, prefix SEI NAL units, NAL units with nal_unit_type in the range of RSV NVCL 25 . . . RSV NVCL 26, or NAL units with nal_unit_type in the range of UNSPEC28 . . . UNSPEC29 are present in a layer access unit, they shall not follow the last VCL NAL unit of the layer access unit.
  NAL units having nal_unit_type equal to SUFFIX_SEI_NUT or RSV_NVCL_27, or in the range of UNSPEC30 . . . UNSPEC31 in a layer access unit shall not precede the first VCL NAL unit of the layer access unit.
  When an end of sequence NAL unit is present in an access unit, it shall be the last NAL unit among all NAL units within the access unit other than an end of bitstream NAL unit (when present).
  When an end of bitstream NAL unit is present in an access unit, it shall be the last NAL unit in the access unit.

Slice header RBSP semantics.

When present, the value of each of the slice header syntax elements slice_pic_parameter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture.

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to slice_pic_parameter_set_id slice_address specifies the slice address of the slice. When not present, the value of slice_address is inferred to be equal to 0.

If rect_slice_flag is equal to 0, the following applies:
  The slice address is the brick ID as specified by Equation (7-59).
  The length of slice_address is Ceil(Log 2 (NumBricksInPic)) bits.
  The value of slice_address shall be in the range of 0 to NumBricksInPic−1, inclusive.

Otherwise (rect_slice_flag is equal to 1), the following applies:

The slice address is the slice ID of the slice.

The length of slice_address is signalled_slice_id_length_minus1+1 bits.

If signalled_slice_id_flag is equal to 0, the value of slice_address shall be in the range of 0 to num_slices_in_pic_minus1, inclusive. Otherwise, the value of slice_address shall be in the range of 0 to $2^{(signalled\_slice\_id\_length\_minus1+1)}-1$, inclusive.

It is a requirement of bitstream conformance that the following constraints apply:

- The value of slice_address shall not be equal to the value of slice_address of any other coded slice NAL unit of the same coded picture.
- When rect_slice_flag is equal to 0, the slices of a picture shall be in increasing order of their slice_address values.
- The shapes of the slices of a picture shall be such that each brick, when decoded, shall have its entire left boundary and entire top boundary consisting of a picture boundary or consisting of boundaries of previously decoded brick(s).

num_bricks_in_slice_minus1, when present, specifies the number of bricks in the slice minus 1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
sliceIdx = 0
while( slice_address != slice_id[ sliceIdx ] )
  sliceIdx++
NumBricksInCurrSlice = NumBricksInSlice[ sliceIdx ]
brickIdx = TopLeftBrickIdx[ sliceIdx ]
for( bIdx = 0; brickIdx <= BottomRightBrickIdx[ sliceIdx ];    (7-92)
brickIdx++ )
  if( BricksToSliceMap[ brickIdx ] = = sliceIdx )
    SliceBrickIdx[ bIdx++ ] = brickIdx
} else {
NumBricksInCurrSlice = num_bricks_in_slice_minus1 + 1
SliceBrickIdx[ 0 ] = slice_address
for( i = 1; i < NumBricksInCurrSlice; i++ )
  SliceBrickIdx[ i ] = SliceBrickIdx[ i − 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[
SliceBrickIdx[ 0 ] ] ] ]
if( subpic_treated_as_pic_flag[ SubPicIdx ] ) {
SubPicLeftBoundaryPos =
SubPicLeft[ SubPicIdx ] * ( subpic_grid_col_width_minus1 + 1 ) * 4
SubPicRightBoundaryPos = ( SubPicLeft[ SubPicIdx ] +
SubPicWidth[ SubPicIdx ] ) *
  ( subpic_grid_col_width_minus1 + 1 ) * 4            (7-93)
SubPicTopBoundaryPos =
SubPicTop[ SubPicIdx ] * ( subpic_grid_row_height_minus1 + 1 )* 4
SubPicBotBoundaryPos = ( SubPicTop[ SubPicIdx ] +
SubPicHeight[ SubPicIdx ] ) *
  ( subpic_grid_row_height_minus1 + 1 ) * 4
}
``` non_reference_picture_flag equal to 1 specifies that the picture containing the slice is never used as a reference picture. non_reference_picture_flag equal to 0 specifies that the picture containing the slice may or may not be used as a reference picture.

slice_type specifies the coding type of the slice according to Table 7-11.

TABLE 7-11

Name association to slice type

| slice_type | Name of slice_type |
|---|---|
| 0 | B (B slice) |
| 1 | P (P slice) |
| 2 | I (I slice) |

When nal_unit_type is a value of nal_unit_type in the range of IDR_W_RADL to CRA_NUT, inclusive, and the current picture is the first picture in an access unit, slice_type shall be equal to 2. When not present, the value of slice_type is inferred to be equal to 2.

colour_plane_id specifies the colour plane associated with the current slice RBSP when separate_colour_plane_flag is equal to 1. The value of colour_plane_id shall be in the range of 0 to 2, inclusive. colour_plane_id values 0, 1 and 2 correspond to the Y, Cb and Cr planes, respectively.

NOTE—: There is no dependency between the decoding processes of pictures having different values of colour_plane_id.

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive.

recovery_poc_cnt specifies the recovery point of decoded pictures in output order. If there is a picture picA that follows the current GDR picture in decoding order in the CVS and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

The variable RpPicOrderCntVal is derived as follows:

$$RpPicOrderCntVal = PicOrderCntVal + recovery\_poc\_cnt \quad (7-94)$$

no_output_of_prior_pics_flag affects the output of previously-decoded pictures in the decoded picture buffer after the decoding of a CLVSS picture that is not the first picture in the bitstream as specified in Annex C.

pic_output_flag affects the decoded picture output and removal processes as specified in Annex C. When pic_output_flag is not present, it is inferred to be equal to 1.

slice_temporal_mvp_enabled_flag specifies whether temporal motion vector predictors can be used for inter prediction. If slice_temporal_mvp_enabled_flag is equal to 0, the syntax elements of the current picture shall be constrained such that no temporal motion vector predictor is used in decoding of the current picture. Otherwise (slice_temporal_mvp_enabled_flag is equal to 1), temporal motion vector predictors may be used in decoding of the current picture.

When slice_temporal_mvp_enabled_flag is not present, the following applies:

If sps_temporal_mvp_enabled_flag is equal to 0, the value of slice_temporal_mvp_enabled_flag is inferred to be equal to 0.

Otherwise (sps_temporal_mvp_enabled_flag is equal to 1), the value of slice_temporal_mvp_enabled_flag is inferred to be equal to pps_temporal_mvp_enabled_idc−1.

mvd_l1_zero_flag equal to 1 indicates that the mvd_coding(x0, y0, 1) syntax structure is not parsed and MvdL1[x0][y0][compIdx] and MvdL1[x0][y0][cpIdx][compIdx] are set equal to 0 for compIdx=0 . . . 1 and cpIdx=0 . . . 2. mvd_l1_zero_flag equal to 0 indicates that the mvd_coding(x0, y0, 1) syntax structure is parsed. When not present, the value of mvd_l1_zero_flag is inferred to be equal to pps_mvd_l1_zero_idc−1.

Decoding process for picture order count.

Output of this process is PicOrderCntVal, the picture order count of the current picture.

Each coded picture is associated with a picture order count variable, denoted as PicOrderCntVal.

When the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

The variable prevPicOrderCntLsb is set equal to pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is a CLVSS picture, PicOrderCntMsb is set equal to 0.

Otherwise, PicOrderCntMsb is derived as follows:

```
if( ( pic_order_cnt_lsb < prevPicOrderCntLsb ) &&
    ( ( prevPicOrderCntLsb − pic_order_cnt_lsb ) >= (
    MaxPicOrderCntLsb / 2 ) ) )
  PicOrderCntMsb = prevPicOrderCntMsb + MaxPicOrderCntLsb    (8-1)
else if( (pic_order_cnt_lsb > prevPicOrderCntLsb) &&
    (( pic_order_cnt_lsb − prevPicOrderCntLsb ) > (
    MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

$$PicorderCntVal = PicOrderCntMsb + pic\_order\_cnt\_lsb \quad (8-2)$$

NOTE 1—All CLVSS pictures will have PicOrderCntVal equal to pic_order_cnt_lsb since for CLVSS pictures PicOrderCntMsb is set equal to 0.

The value of PicOrderCntVal shall be in the range of $-2^{31}$ to $2^{31}-1$, inclusive.

In one CVS, the PicOrderCntVal values for any two coded pictures with the same value of nuh_layer_id shall not be the same.

All pictures in any particular access unit shall have the same value of PicOrderCntVal.

The function PicOrderCnt(picX) is specified as follows:

$$PicorderCnt(picX) = PicOrderCntVal \text{ of the picture } picX \quad (8-3)$$

The function DiffPicOrderCnt(picA, picB) is specified as follows:

$$DiffPicOrderCnt(picA, picB) = PicOrderCnt(picA) - PicOrderCnt(picB) \quad (8-4)$$

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

General decoding process for generating unavailable reference pictures.

This process is invoked once per coded picture when the current picture is a CRA picture with NoIncorrectPicOutputFlag equal to 1 or a GDR picture with NoIncorrectPicOutputFlag equal to 1.

When this process is invoked, the following applies:

For each RefPicList[i][j], with i in the range of 0 to 1, inclusive, and j in the range of 0 to num_ref_entries[i][RplsIdx[i]]−1, inclusive, that is equal to "no reference picture," a picture is generated as specified in subclause 8.3.4.2 and the following applies.

The value of nuh_layer_id for the generated picture is set equal to nuh_layer_id of the current picture.

If st_ref_pic_flag[i][RplsIdx[i]][j] is equal to 1, the value of PicOrderCntVal for the generated picture is set equal to RefPicPocList[i][j] and the generated picture is marked as "used for short-term reference."

Otherwise (st_ref_pic_flag[i][RplsIdx[i]][j] is equal to 0), the value of PicOrderCntVal for the generated picture is set equal to RefPicLtPocList[i][j], the value of pic_order_cnt_lsb for the generated picture is inferred to be equal to (RefPicLtPocList[i][j] & (MaxPicOrderCntLsb−1)), and the generated picture is marked as "used for long-term reference."

The value of PicOutputFlag for the generated reference picture is set equal to 0.

RefPicList[i][j] is set to be the generated reference picture.

Derivation process for temporal luma motion vector prediction.

The variables mvLXCol and availableFlagLXCol are derived as follows:

If pic_temporal_mvp_enabled_flag is equal to 0 or (cbWidth*cbHeight) is less than or equal to 32, both components of mvLXCol are set equal to 0 and availableFlagLXCol is set equal to 0.

Otherwise (pic_temporal_mvp_enabled_flag is equal to 1), the following ordered steps apply.

1. The bottom right collocated motion vector and the bottom and right boundary sample locations are derived as follows:

$$xColBr = xCb + cbWidth \quad (8\text{-}421)$$

$$yColBr = yCb + cbHeight \quad (8\text{-}422)$$

-continued

*rightBoundryPos* = subpic_treated_as_pic_flag[*SubPicIdx*] ?  (8-423)
*SubPicRightBoundryPos*: pic_width_in_luma_samples − 1

*botBoundryPos* = subpic_treated_as_pic_flag[*SubPicIdx*] ?  (8-424)
*SubPicBotBoundryPos*: pic_height_in_luma_samples − 1

If yCb>>CtbLog 2SizeY is equal to yColBr>>CtbLog 2SizeY, yColBr is less than or equal to botBoundaryPos and xColBr is less than or equal to rightBoundaryPos, the following applies.

The variable colCb specifies the luma coding block covering the modified location given by ((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.

Otherwise, both components of mvLXCol are set equal to 0 and availableFlagLXCol is set equal to 0.

2. When availableFlagLXCol is equal to 0, the central collocated motion vector is derived as follows:

$$xColCtr = xCb + (cbWidth \gg 1) \quad (8\text{-}425)$$

$$yColCtr = yCb + (cbHeight \gg 1) \quad (8\text{-}426)$$

The variable colCb specifies the luma coding block covering the modified location given by ((xColCtr>>3)<<3, (yColCtr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.

Derivation process for subblock-based temporal merging candidates.

The availability flag availableFlagSbCol is derived as follows.

If one or more of the following conditions is true, availableFlagSbCol is set equal to 0.
pic_temporal_mvp_enabled_flag is equal to 0.
sps_sbtmvp_enabled_flag is equal to 0.
cbWidth is less than 8.
cbHeight is less than 8.

Otherwise, the following ordered steps apply.

1. The location (xCtb, yCtb) of the top-left sample of the luma coding tree block that contains the current coding block and the location (xCtr, yCtr) of the below-right center sample of the current luma coding block are derived as follows:

$$xCtb = (xCb \gg CtuLog2Size) \ll CtuLog2Size \quad (8\text{-}542)$$

$$yCtb = (yCb \gg CtuLog2Size) \ll CtuLog2Size \quad (8\text{-}543)$$

$$xCtr = xCb + (cbWidth/2) \quad (8\text{-}544)$$

$$yCtr = yCb + (cbHeight/2) \quad (8\text{-}545)$$

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.

3. The derivation process for subblock-based temporal merging base motion data as specified in clause 8.5.5.4 is invoked with the location (xCtb, yCtb), the location (xColCtrCb, yColCtrCb), the availability flag availableFlagA$_1$, and the prediction list utilization flag predFlagLXA$_1$, and the reference index refIdxLXA$_1$, and the motion vector mvLXA$_1$, with X being 0 and 1 as inputs and the motion vectors ctrMvLX, and the prediction list utilization flags ctrPredFlagLX of the collocated block, with X being 0 and 1, and the temporal motion vector tempMv as outputs.

4. The variable availableFlagSbCol is derived as follows.
If both ctrPredFlagL0 and ctrPredFlagL1 are equal to 0, availableFlagSbCol is set equal to 0.
Otherwise, availableFlagSbCol is set equal to 1.

Derivation process for constructed affine control point motion vector merging candidates.

The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows.

The reference indices for the temporal merging candidate, refIdxLXCorner[3], with X being 0 or 1, are set equal to 0.

The variables mvLXCol and availableFlagLXCol, with X being 0 or 1, are derived as follows:
If pic_temporal_mvp_enabled_flag is equal to 0, both components of mvLXCol are set equal to 0 and availableFlagLXCol is set equal to 0.
Otherwise (pic_temporal_mvp_enabled_flag is equal to 1), the following applies:

$$xColBr = xCb + cbWidth \quad (8\text{-}601)$$

$$yColBr = yCb + cbHeight \quad (8\text{-}602)$$

If yCb>>CtbLog 2SizeY is equal to yColBr>>CtbLog 2SizeY, yColBr is less than pic_height_in_luma_samples and xColBr is less than pic_width_in_luma_samples, the following applies.

The variable colCb specifies the luma coding block covering the modified location given by ((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.

Otherwise, both components of mvLXCol are set equal to 0 and availableFlagLXCol is set equal to 0.

The variables availableFlagCorner[3], predFlagL0Corner[3], cpMvL0Corner[3] and predFlagL1Corner[3] are derived as follows.

$$availableFlagCorner[3] = availibleFlagL0Col \qquad (8\text{-}603)$$

$$predFlagL0Corner[3] = availibleFlagL0Col \qquad (8\text{-}604)$$

$$cpMvL0Corner[3] = mvL0Col \qquad (8\text{-}605)$$

$$predFlagL1Corner[3] = 0 \qquad (8\text{-}606)$$

When slice_type is equal to B, the variables availableFlagCorner[3], predFlagL1Corner[3] and cpMvL1Corner[3] are derived as follows.

$$availableFlagCorner[3] = \\ availableFlagL0Corner||availableFlagL1Col \qquad (8\text{-}607)$$

$$predFlagL1Corner[3] = availableFlagL1Col \qquad (8\text{-}608)$$

$$cpMvL1Corner[3] = mvL1Col \qquad (8\text{-}609)$$

Figure 11:
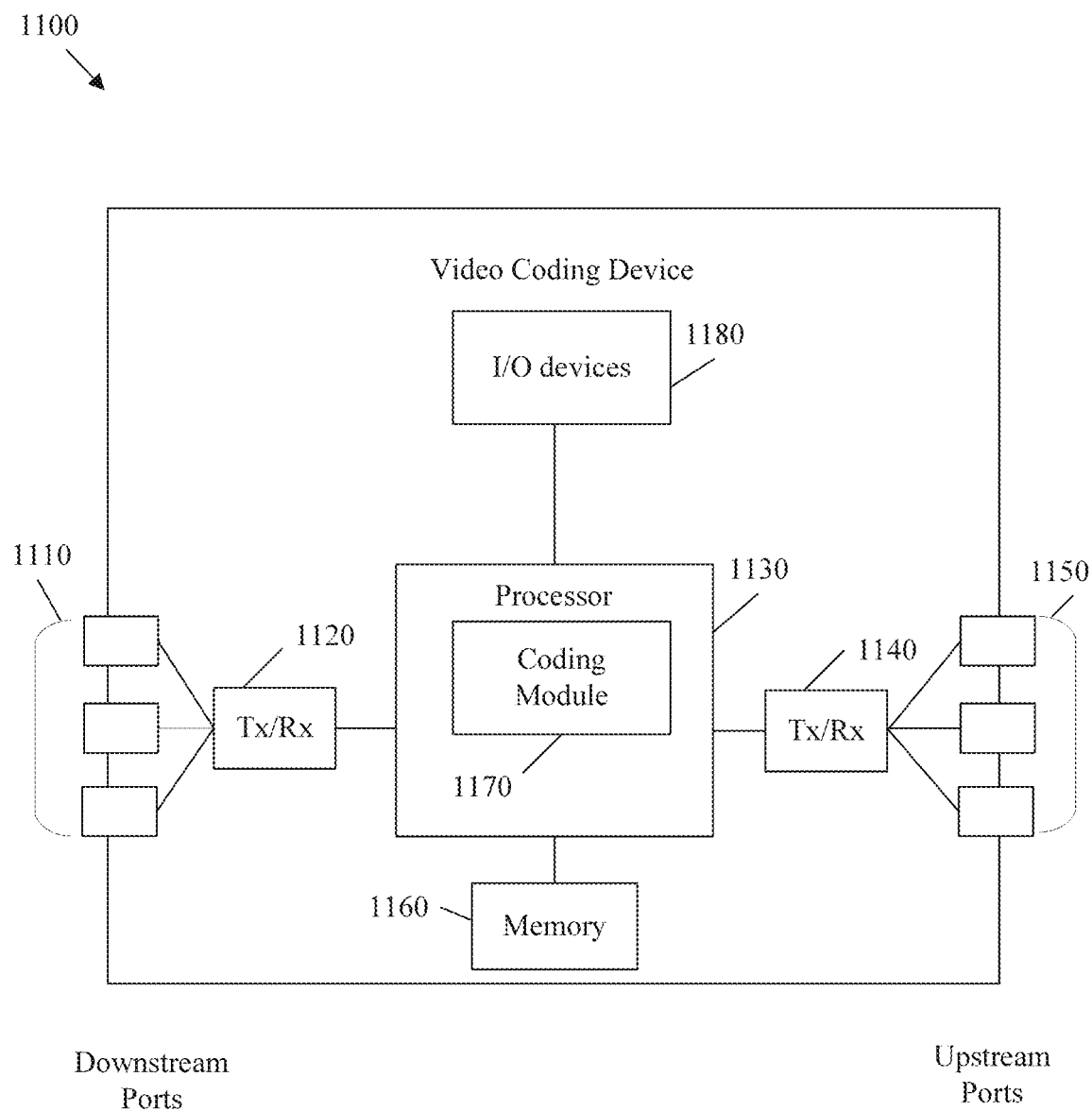
FIG. 11 is a schematic diagram of a video coding device.

FIG. 11 is a schematic diagram of a video coding device 1100 (e.g., a video encoder 300 or a video decoder 400) according to an embodiment of the disclosure. The video coding device 1100 is suitable for implementing the disclosed embodiments as described herein. The video coding device 1100 comprises ingress ports 1110 and receiver units (Rx) 1120 for receiving data; a processor, logic unit, or central processing unit (CPU) 1130 to process the data; transmitter units (Tx) 1140 and egress ports 1150 for transmitting the data; and a memory 1160 for storing the data. The video coding device 1100 may also comprise optical-to-electrical (OE) components and electrical-to-optical (EO) components coupled to the ingress ports 1110, the receiver units 1120, the transmitter units 1140, and the egress ports 1150 for egress or ingress of optical or electrical signals.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a coding module 1170. The coding module 1170 implements the disclosed embodiments described above. For instance, the coding module 1170 implements, processes, prepares, or provides the various codec functions. The inclusion of the coding module 1170 therefore provides a substantial improvement to the functionality of the video coding device 1100 and effects a transformation of the video coding device 1100 to a different state. Alternatively, the coding module 1170 is implemented as instructions stored in the memory 1160 and executed by the processor 1130.

The video coding device 1100 may also include input and/or output (I/O) devices 1180 for communicating data to and from a user. The I/O devices 1180 may include output devices such as a display for displaying video data, speakers for outputting audio data, etc. The I/O devices 1180 may also include input devices, such as a keyboard, mouse, trackball, etc., and/or corresponding interfaces for interacting with such output devices.

The memory 1160 comprises one or more disks, tape drives, and solid-state drives and may be used as an overflow data storage device, to store programs when such programs are selected for execution, and to store instructions and data that are read during program execution. The memory 1160 may be volatile and/or non-volatile and may be read-only memory (ROM), random access memory (RAM), ternary content-addressable memory (TCAM), and/or static random-access memory (SRAM).

Figure 12:
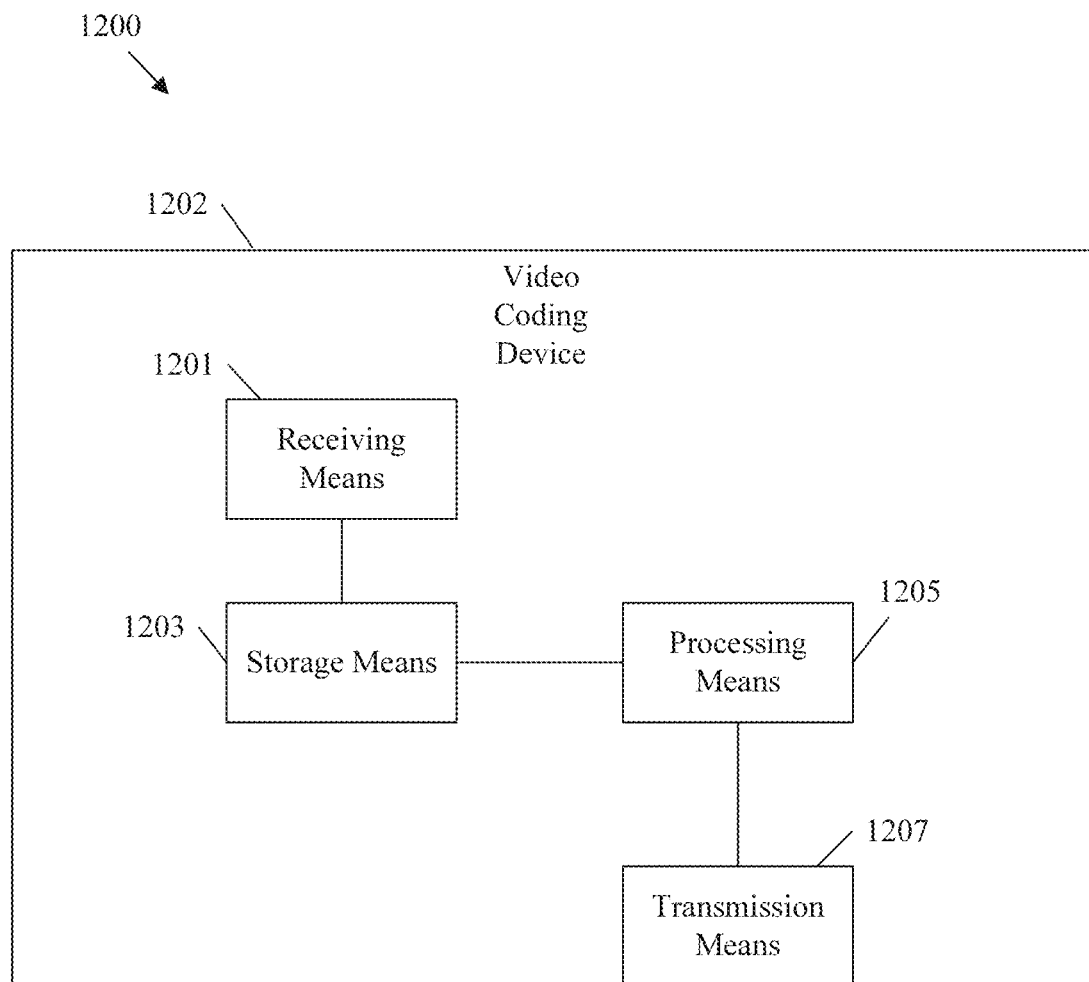
FIG. 12 is a schematic diagram of an embodiment of a means for coding.

FIG. 12 is a schematic diagram of an embodiment of a means for coding 1200. In an embodiment, the means for coding 1200 is implemented in a video coding device 1202 (e.g., a video encoder 300 or a video decoder 400). The video coding device 1202 includes receiving means 1201. The receiving means 1201 is configured to receive a picture to encode or to receive a bitstream to decode. The video coding device 1202 includes transmission means 1207 coupled to the receiving means 1201. The transmission means 1207 is configured to transmit the bitstream to a decoder or to transmit a decoded image to a display means (e.g., one of the I/O devices 1180).

The video coding device 1202 includes a storage means 1203. The storage means 1203 is coupled to at least one of the receiving means 1201 or the transmission means 1207. The storage means 1203 is configured to store instructions. The video coding device 1202 also includes processing means 1205. The processing means 1205 is coupled to the storage means 1203. The processing means 1205 is configured to execute the instructions stored in the storage means 1203 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
receiving a video bitstream including a picture unit (PU), the PU including a picture header (PH) network abstraction layer (NAL) unit preceding a first video coding layer (VCL) NAL unit, wherein the first VCL NAL unit includes a slice of a coded picture, wherein the PH NAL unit is a non-VCL NAL unit, and wherein a value of a temporal identifier (TemporalId) for non-VCL NAL units is constrained as follows:
when a NAL unit type (nal_unit_type) is equal to dependency parameter set NAL unit type (DPS_NUT), video parameter set NAL unit type (VPS_NUT), or sequence parameter set NAL unit type (SPS_NUT), the temporal identifier for the non-VCL NAL units is equal to 0 and a temporal identifier of the PU containing the NAL unit shall be equal to 0, and
when the nal_unit type is equal to PH NAL unit type (PH_NUT), the temporal identifier for the non-VCL NAL units shall be equal to the temporal identifier of the PU containing the NAL unit; and
decoding the coded picture from the PU to obtain a decoded picture.

2. The method of claim 1, wherein the PU includes only one picture header (PH), and wherein the coded picture is the only picture in the PU.

3. The method of claim 1, wherein the PH NAL unit in the PU precedes each VCL NAL unit in the PU inclusive of the first VCL NAL unit of the PU.

4. The method of claim 1, wherein the first VCL NAL unit includes a slice of the coded picture.

5. The method of claim 2, wherein the PH NAL unit includes the only one PH.

6. The method of claim 5, wherein the only one PH in the PH NAL unit includes syntax elements that apply to all slices of the coded picture.

7. The method of claim 1, wherein the first VCL NAL unit is an initial VCL NAL unit in the PU.

8. The method of claim 1, further comprising displaying the decoded picture on a display of an electronic device.

9. A method of encoding implemented by a video encoder, the method comprising:
generating a picture unit (PU) including a picture header (PH) network abstraction layer (NAL) unit preceding a first video coding layer (VCL) NAL unit, wherein the first VCL NAL unit includes a slice of a coded picture, wherein the PH NAL unit is a non-VCL NAL unit, and wherein a value of a temporal identifier (TemporalId) for non-VCL NAL units is constrained as follows:
when a NAL unit type (nal_unit_type) is equal to dependency parameter set NAL unit type (DPS_NUT), video parameter set NAL unit type (VPS_NUT), or sequence parameter set NAL unit type (SPS_NUT), the temporal identifier for the non-VCL NAL units is equal to 0 and a temporal identifier of the PU containing the NAL unit shall be equal to 0, and
when the nal_unit type is equal to PH NAL unit type (PH_NUT), the temporal identifier for the non-VCL NAL units shall be equal to the temporal identifier of the PU containing the NAL unit;
encoding the PU into a video bitstream; and
storing the video bitstream for communication toward a video decoder.

10. The method of claim 9, wherein the PU includes only one picture header (PH) and the coded picture, and wherein the coded picture is the only picture in the PU.

11. The method of claim 9, wherein the PH NAL unit in the PU precedes each VCL NAL unit in the PU inclusive of the first VCL NAL unit.

12. The method of claim 9, wherein the first VCL NAL unit includes a slice of the coded picture.

13. A decoding device, comprising:
a receiver configured to receive a video bitstream including a picture unit (PU), the PU including a picture header (PH) network abstraction layer (NAL) unit preceding a first video coding layer (VCL) NAL unit, wherein the first VCL NAL unit includes a slice of a coded picture, wherein the PH NAL unit is a non-VCL NAL unit, and wherein a value of a temporal identifier (TemporalId) for non-VCL NAL units is constrained as follows:
when a NAL unit type (nal_unit_type) is equal to dependency parameter set NAL unit type (DPS_NUT), video parameter set NAL unit type (VPS_NUT), or sequence parameter set NAL unit type (SPS_NUT), the temporal identifier for the non-VCL NAL units is equal to 0 and a temporal identifier of the PU containing the NAL unit shall be equal to 0, and
when the nal_unit type is equal to PH NAL unit type (PH_NUT), the temporal identifier for the non-VCL NAL units shall be equal to the temporal identifier of the PU containing the NAL unit;
a memory coupled to the receiver, the memory storing instructions; and
one or more processors coupled to the memory, the one or more processors configured to execute the instructions to cause the decoding device to decode the coded picture from the PU to obtain a decoded picture.

14. The decoding device of claim 13, wherein the PU includes only one picture header (PH), and wherein the coded picture is the only picture in the PU.

15. The decoding device of claim 13, wherein the PH NAL unit in the PU precedes each VCL NAL unit in the PU inclusive of the first VCL NAL unit.

16. The decoding device of claim 13, wherein the first VCL NAL unit includes a slice of the coded picture.

17. An encoding device, comprising:
a memory containing instructions;
one or more processors coupled to the memory, the one or more processors configured to implement the instructions to cause the encoding device to:
generate a picture unit (PU) including a picture header (PH) network abstraction layer (NAL) unit preceding a first video coding layer (VCL) NAL unit, wherein the first VCL NAL unit includes a slice of a coded picture, wherein the PH NAL unit is a non-VCL NAL unit, and wherein a value of a temporal identifier (TemporalId) for non-VCL NAL units is constrained as follows:
when a NAL unit type (nal_unit_type) is equal to dependency parameter set NAL unit type (DPS_NUT), video parameter set NAL unit type (VPS_NUT), or sequence parameter set NAL unit type (SPS_NUT), the temporal identifier for the non-VCL NAL units is equal to 0 and a temporal identifier of the PU containing the NAL unit shall be equal to 0, and
when the nal_unit type is equal to PH NAL unit type (PH_NUT), the temporal identifier for the non- VCL NAL units shall be equal to the temporal identifier of the PU containing the NAL unit;
encode the PU into a video bitstream; and
a transmitter coupled to the one or more processors, the transmitter configured to transmit the video bitstream toward a video decoder.

18. The encoding device of claim 17, wherein the PU includes only one picture header (PH) and the coded picture, and wherein the coded picture is the only picture in the PU.

19. The encoding device of claim 17, wherein the PH NAL unit in the PU precedes each VCL NAL unit in the PU inclusive of the first VCL NAL unit, and wherein the first VCL NAL unit includes a slice of the coded picture.

* * * * *

UNITED STATES PATENT AND TRADEMARK OFFICE
CERTIFICATE OF CORRECTION

| | | |
|---|---|---|
| PATENT NO. | : 12,407,861 B2 | Page 1 of 1 |
| APPLICATION NO. | : 17/702418 | |
| DATED | : September 2, 2025 | |
| INVENTOR(S) | : Fnu Hendry et al. | |

It is certified that error appears in the above-identified patent and that said Letters Patent is hereby corrected as shown below:

On the Title Page

Item (71) Applicant: Delete "Huawei Technologies Co., Ltd., Guangdong (CN)" and insert
-- Huawei Technologies Co., Ltd., Shenzhen (CN) --.

Signed and Sealed this
Eleventh Day of November, 2025

John A. Squires
*Director of the United States Patent and Trademark Office*